United States Patent
Tamori et al.

(10) Patent No.: US 6,757,743 B1
(45) Date of Patent: Jun. 29, 2004

(54) COMMUNICATION CONTROL SYSTEM AND METHOD, COMMUNICATION SYSTEM, AND RECORDING MEDIUM

(75) Inventors: Hirofumi Tamori, Tokyo (JP); Tomomichi Kataoka, Chiba (JP); Takashi Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 702 days.

(21) Appl. No.: 09/605,012

(22) Filed: Jun. 27, 2000

(30) Foreign Application Priority Data

Jun. 30, 1999 (JP) ........................................ P11-184682

(51) Int. Cl.$^7$ .............................................. G06F 15/16
(52) U.S. Cl. ..................................... 709/249; 370/401
(58) Field of Search ........................... 709/249; 370/401

(56) References Cited

U.S. PATENT DOCUMENTS 5,638,377 A * 6/1997 Quinquis et al. ........... 370/392
6,389,496 B1 * 5/2002 Matsuda ..................... 710/316
6,519,671 B1 * 2/2003 Kondou et al. ............. 710/311
6,601,127 B1 * 7/2003 Nomura et al. ............. 710/306

OTHER PUBLICATIONS

NEC Developes World's First IEEE1394 Bridge for Multimedia Home Networks http://www.nec.co.jp/press/en/9905/2701 Press Release May 27, 1999.*

* cited by examiner

Primary Examiner—Mehmet B. Geckil
(74) Attorney, Agent, or Firm—Oblon, Spivak, McClelland, Maier & Neustadt, P.C.

(57) ABSTRACT

Provided is a user-friendly system for dynamically connecting or disconnecting equipment. A user uses a display presented on the screen of a user interface to instruct connection or the like of desired equipment. The display presented on the screen is based on information contained in the database. The information is managed by a control server. A terminal control facility incorporated in a bridge sets an isochronous channel and a connection identification number in response to an instruction of connection. The set isochronous channel number and connection identification number are placed in the database. The control server controls the whole system according to the information.

23 Claims, 23 Drawing Sheets

FIG. 2A oMPR

| DATA RATE CAPABILITY | BROADCAST CHANNEL BASE | NON-PERSISTENT EXTENSION FIELD | PERSISTENT EXTENSION FIELD | RESERVED | NUMBER OF OUTPUT PLUGS |
|---|---|---|---|---|---|
| 2 | 6 | 8 | 8 | 3 | 5 (BIT) |

FIG. 2B oPCR[n]

| ON-LINE | BROADCAST CONNECTION COUNTER | POINT-TO-POINT CONNECTION COUNTER | RESERVED | CHANNEL NUMBER | DATA RATE | OVERHEAD ID | PAYLOAD |
|---|---|---|---|---|---|---|---|
| 1 | 1 | 6 | 3 | 8 | 2 | 4 | 10 (BIT) |

FIG. 2C iMPR

| DATA RATE CAPABILITY | RESERVED | NON-PERSISTENT EXTENSION FIELD | PERSISTENT EXTENSION FIELD | RESERVED | NUMBER OF INPUT PLUGS |
|---|---|---|---|---|---|
| 2 | 6 | 8 | 8 | 3 | 5 (BIT) |

FIG. 2D iPCR[n]

| ON-LINE | BROADCAST CONNECTION COUNTER | POINT-TO-POINT CONNECTION COUNTER | RESERVED | CHANNEL NUMBER | RESERVED |
|---|---|---|---|---|---|
| 1 | 1 | 6 | 2 | 6 | 16 (BIT) |

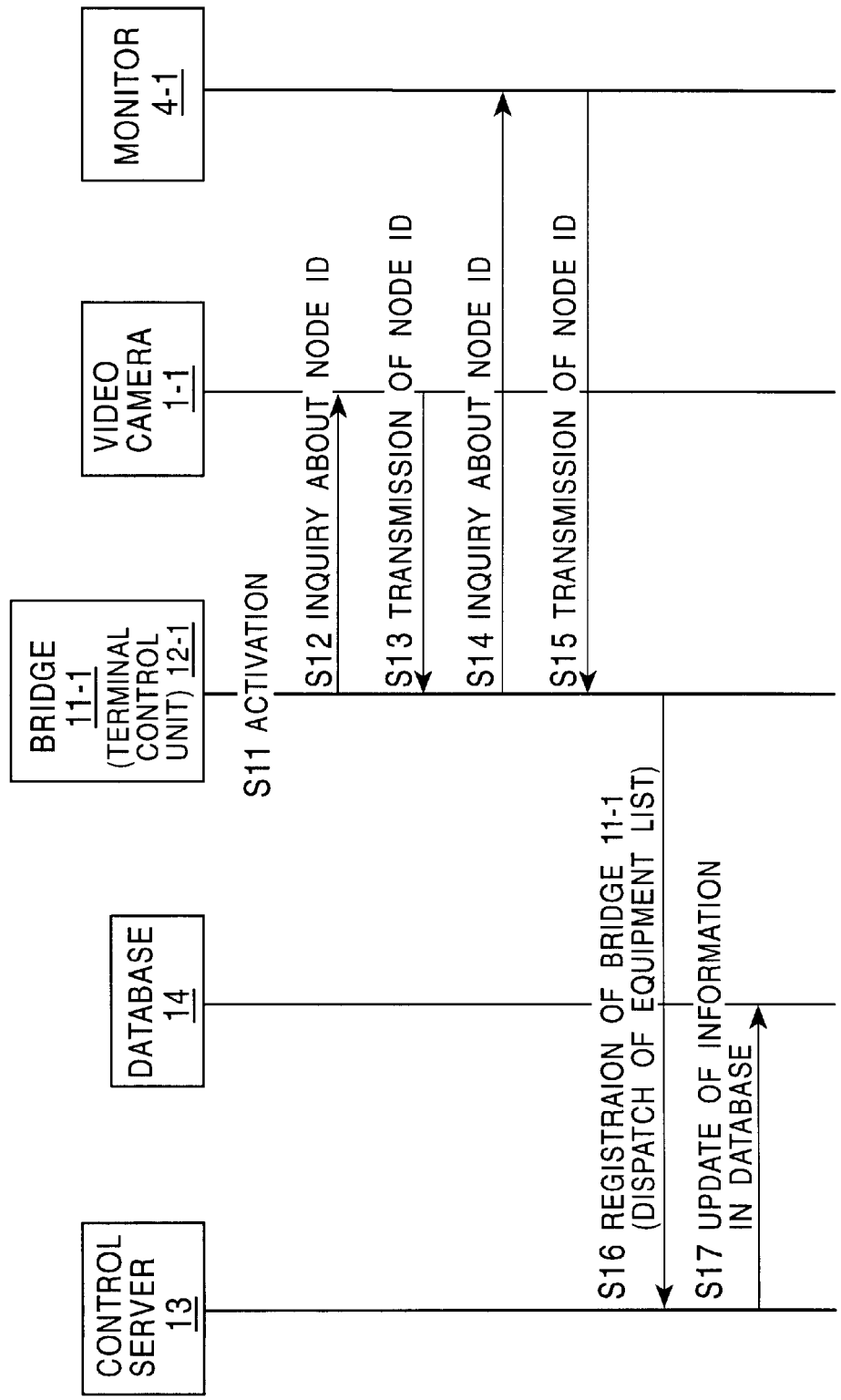

FIG. 8

TABLE 1 : CORRESPONDENCE BETWEEN IDENTIFICATION NAMES OF BRIDGES AND IP ADDRESSES THEREOF

| IDENTIFICATION NAME OF BRIDGE | IP ADDRESS OF BRIDGE |
|---|---|
| BRIDGE 11-1 | 192. 168. 0. 1 |
| BRIDGE 11-2 | 192. 168. 0. 2 |

TABLE 2 : CORRESPONDENCE BETWEEN IDENTIFICATION NAMES OF BRIDGES AND ATM ADDRESSES THEREOF

| IDENTIFICATION NAME OF BRIDGE | ATM ADDRESS OF BRIDGE |
|---|---|
| BRIDGE 11-1 | 47. 00. 11 ···· 00. 00 |
| BRIDGE 11-2 | 47. 00. 11 ···· 01. 00 |

TABLE 3 : CORRESPONDENCE BETWEEN IDENTIFICATION NAMES OF BRIDGES AND NODE IDENTIFICATION NUMBERS OF EQUIPMENT CONNECTED

| IDENTIFICATION NAME OF BRIDGE | NODE IDENTIFICATION NUMBER OF EQUIPMENT |
|---|---|
| BRIDGE 11-1 | 08004601 0010001 |
| BRIDGE 11-1 | 08004601 0010002 |
| BRIDGE 11-2 | 08004603 0030001 |
| BRIDGE 11-2 | 08004603 0030002 |

TABLE 4 : CONNECTION MANAGEMENT

| DATA OUTPUTTING SIDE | | | | DATA INPUTTING SIDE | | | |
|---|---|---|---|---|---|---|---|
| NODE IDENTIFICATION NUMBER OF EQUIPMENT | CONNECTION ID | Leaf ID | Iso.ch | NODE IDENTIFICATION NUMBER OF EQUIPMENT | CONNECTION ID | Leaf ID | Iso.ch |
| EMPTY BECAUSE NO CONNECTION IS ESTABLISHED | | | | | | | |

FIG. 12

USER INTERFACE

| SELECTION FOR TRANSMISSION | | | |
|---|---|---|---|
| ROOM A | | | |
| VIDEO CAMERA 1-1 | MONITOR 4-1 | | |
| ROOM B | | | |
| VIDEO CAMERA 1-2 | MONITOR 4-2 | | |
| ROOM C | | | |
| VIDEO CAMERA 1-3 | MONITOR 4-3 | | |
| ROOM D | | | |
| VIDEO CAMERA 1-4 | VIDEO CAMERA 1-5 | MONITOR 4-4 | MONITOR 4-5 |

← 31

| SELECTION FOR RECEPTION | | | |
|---|---|---|---|
| ROOM A | | | |
| VIDEO CAMERA 1-1 | MONITOR 4-1 | | |
| ROOM B | | | |
| VIDEO CAMERA 1-2 | MONITOR 4-2 | | |
| ROOM C | | | |
| VIDEO CAMERA 1-3 | MONITOR 4-3 | | |
| ROOM D | | | |
| VIDEO CAMERA 1-4 | VIDEO CAMERA 1-5 | MONITOR 4-4 | MONITOR 4-5 |

FIG. 15

TABLE 1 : CORRESPONDENCE BETWEEN IDENTIFICATION NAMES OF BRIDGES AND IP ADDRESSES THEREOF

| IDENTIFICATION NAME OF BRIDGE | IP ADDRESS OF BRIDGE |
|---|---|
| BRIDGE 11-1 | 192. 168. 0. 1 |
| BRIDGE 11-2 | 192. 168. 0. 2 |
| BRIDGE 11-3 | 192. 168. 0. 3 |
| BRIDGE 11-4 | 192. 168. 0. 4 |

TABLE 2 : CORRESPONDENCE BETWEEN IDENTIFICATION NAMES OF BRIDGES AND ATM ADDRESSES THEREOF

| IDENTIFICATION NAME OF BRIDGE | ATM ADDRESS OF BRIDGE |
|---|---|
| BRIDGE 11-1 | 47. 00. 11 ···· 00. 00 |
| BRIDGE 11-2 | 47. 00. 11 ···· 01. 00 |
| BRIDGE 11-3 | 47. 00. 11 ···· 02. 00 |
| BRIDGE 11-4 | 47. 00. 11 ···· 03. 00 |

TABLE 3 : CORRESPONDENCE BETWEEN IDENTIFICATION NAMES OF BRIDGES AND NODE IDENTIFICATION NUMBERS OF EQUIPMENT CONNECTED

| IDENTIFICATION NAME OF BRIDGE | NODE IDENTIFICATION NUMBER OF EQUIPMENT |
|---|---|
| BRIDGE 11-1 | 08004601 0010001 |
| BRIDGE 11-1 | 08004601 0010002 |
| BRIDGE 11-2 | 08004603 0030001 |
| BRIDGE 11-2 | 08004603 0030002 |
| ⋮ | ⋮ |
| BRIDGE 11-4 | 08004608 0070004 |

TABLE 4 : CONNECTION MANAGEMENT

| DATA OUTPUTTING SIDE | | | | DATA INPUTTING SIDE | | | |
|---|---|---|---|---|---|---|---|
| NODE IDENTIFICATION NUMBER OF EQUIPMENT | CONNECTION ID | Leaf ID | Iso.ch | NODE IDENTIFICATION NUMBER OF EQUIPMENT | CONNECTION ID | Leaf ID | Iso.ch |
| 08004601 0010001 | 1 | 0 | 62 | 08004603 0030002 | 2 | 0 | 61 |

FIG. 18

TABLE 1 : CORRESPONDENCE BETWEEN IDENTIFICATION NAMES OF BRIDGES AND IP ADDRESSES THEREOF

| IDENTIFICATION NAME OF BRIDGE | IP ADDRESS OF BRIDGE |
|---|---|
| BRIDGE 11-1 | 192.168.0.1 |
| BRIDGE 11-2 | 192.168.0.2 |
| BRIDGE 11-3 | 192.168.0.3 |
| BRIDGE 11-4 | 192.168.0.4 |

TABLE 2 : CORRESPONDENCE BETWEEN IDENTIFICATION NAMES OF BRIDGES AND ATM ADDRESSES THEREOF

| IDENTIFICATION NAME OF BRIDGE | ATM ADDRESS OF BRIDGE |
|---|---|
| BRIDGE 11-1 | 47.00.11 ⋯ 00.00 |
| BRIDGE 11-2 | 47.00.11 ⋯ 01.00 |
| BRIDGE 11-3 | 47.00.11 ⋯ 02.00 |
| BRIDGE 11-4 | 47.00.11 ⋯ 03.00 |

TABLE 3 : CORRESPONDENCE BETWEEN IDENTIFICATION NAMES OF BRIDGES AND NODE IDENTIFICATION NUMBERS OF EQUIPMENT CONNECTED

| IDENTIFICATION NAME OF BRIDGE | NODE IDENTIFICATION NUMBER OF EQUIPMENT |
|---|---|
| BRIDGE 11-1 | 08004601 0010001 |
| BRIDGE 11-1 | 08004601 0010002 |
| BRIDGE 11-2 | 08004603 0030001 |
| BRIDGE 11-2 | 08004603 0030002 |
| ⋮ | ⋮ |
| BRIDGE 11-4 | 08004608 0070004 |

TABLE 4 : CONNECTION MANAGEMENT

| DATA OUTPUTTING SIDE | | | | DATA INPUTTING SIDE | | | |
|---|---|---|---|---|---|---|---|
| NODE IDENTIFICATION NUMBER OF EQUPMENT | CONNECTION ID | Leaf ID | Iso.ch | NODE IDENTIFICATION NUMBER OF EQUPMENT | CONNECTION ID | Leaf ID | Iso.ch |
| 08004601 0010001 | 1 | 0 | 62 | 08004603 0030002 | 2 | 0 | 61 |
| 08004603 0030001 | 2 | 0 | 51 | 08004605 0050002 | 3 | 0 | 60 |

FIG. 23

TABLE 1 : CORRESPONDENCE BETWEEN IDENTIFICATION NAMES OF BRIDGES AND IP ADDRESSES THEREOF

| IDENTIFICATION NAME OF BRIDGE | IP ADDRESS OF BRIDGE |
|---|---|
| BRIDGE 11-1 | 192.168.0.1 |
| BRIDGE 11-2 | 192.168.0.2 |
| BRIDGE 11-3 | 192.168.0.3 |
| BRIDGE 11-4 | 192.168.0.4 |

TABLE 2 : CORRESPONDENCE BETWEEN IDENTIFICATION NAMES OF BRIDGES AND ATM ADDRESSES THEREOF

| IDENTIFICATION NAME OF BRIDGE | ATM ADDRESS OF BRIDGE |
|---|---|
| BRIDGE 11-1 | 47.00.11 ···· 00.00 |
| BRIDGE 11-2 | 47.00.11 ···· 01.00 |
| BRIDGE 11-3 | 47.00.11 ···· 02.00 |
| BRIDGE 11-4 | 47.00.11 ···· 03.00 |

TABLE 3 : CORRESPONDENCE BETWEEN IDENTIFICATION NAMES OF BRIDGES AND NODE IDENTIFICATION NUMBERS OF EQUIPMENT CONNECTED

| IDENTIFICATION NAME OF BRIDGE | NODE IDENTIFICATION NUMBER OF EQUIPMENT |
|---|---|
| BRIDGE 11-1 | 08004601  0010001 |
| BRIDGE 11-1 | 08004601  0010002 |
| BRIDGE 11-2 | 08004603  0030001 |
| BRIDGE 11-2 | 08004603  0030002 |
| ⋮ | ⋮ |
| BRIDGE 11-4 | 08004608  0070004 |

TABLE 4 : CONNECTION MANAGEMENT

| DATA OUTPUTTING SIDE | | | | DATA INPUTTING SIDE | | | |
|---|---|---|---|---|---|---|---|
| NODE IDENTIFICATION NUMBER OF EQUIPMENT | CONNECTION ID | Leaf ID | Iso.ch | NODE IDENTIFICATION NUMBER OF EQUIPMENT | CONNECTION ID | Leaf ID | Iso.ch |
| 08004601  0010001 | 1 | 0 | 62 | 08004603  0030002 | 2 | 0 | 61 |
| 08004601  0010001 | 1 | 1 | 62 | 08004605  0050002 | 2 | 1 | 62 |

COMMUNICATION CONTROL SYSTEM AND METHOD, COMMUNICATION SYSTEM, AND RECORDING MEDIUM

BACKGROUND OF THE INVENTION

1. Field of the Invention

The present invention relates to a communication control system and method, a communication system, and a recording medium. More particularly, this invention is concerned with a communication control system and method for dynamically managing connection or disconnection of equipment within a system, a communication system, and a recording medium.

2. Description of the Related Art

FIG. 1 shows an example of the configuration of a system for transferring data placed on a fast serial bus conformable to the standard 1394 stipulated by the Institute of Electrical and Electronics Engineers (IEEE) over an asynchronous transfer mode (ATM) network. A video camera 1 is connected to a bridge 3-1 over an IEEE 1394 bus 2-1. Likewise, a monitor 4 is connected to a bridge 3-2 over an IEEE 1394 bus 2-2. The bridge 3-1 and bridge 3-2 are interconnected with an ATM switch 5 between them. For connecting the bridges 3-1 and 3-2 to the ATM switch 5, for example, an optical fiber is used.

Hereinafter, the IEEE 1394 buses 2-1 and 2-2 shall be generically referred to as an IEEE 1394 bus 2 unless they are required to be separated from each other. The same applies to the other components.

In the system shown in FIG. 1, an image produced by the video camera 1 is transmitted to the monitor 4 and then reproduced. At this time, the video camera 1 outputs image data to the bridge 3-1 at an isochronous channel 63. The bridge 3-1 is designed (initialized) so that channel numbers (0 to 63) will be associated with virtual channel identifiers (VCIS) or virtual path identifiers (VPI), which are employed in ATM communication, on a one-to-one basis. Herein, the bridge 3-1 is pre-set so that when data is transmitted at the channel 63, the bridge 3-1 starts transmitting the data in the ATM using an inherent virtual channel of an associated VCI or an inherent virtual path of an associated VPI. An ATM switch 5 selects the bridge 3-2 as a destination specified with the VCI or VPI, and transfers the data to the bridge 3-2.

When a connection has been established between the bridges 3-1 and 3-2, the connection is used to transfer image data. The bridge 3-2 converts received image data into data of a form acceptable by the monitor 4, and transfers the resultant image data to the monitor 4 over the IEEE 1394 bus 2-2.

As mentioned above, when the IEEE 1394 bus and ATM network is employed in a system, the permanent virtual connection (PVC) mode is adopted. According to the PVC mode, paths are determined relative to all remote terminals on a communication network, and a local terminal communicates with fixed remote terminals while being connected thereto all the time.

Equipment to be connected to other equipment over the IEEE 1394 bus, such as, the aforesaid video camera 1 and monitor 4 has an AV register incorporated therein. By changing values to be set in the AV register, isochronous channels at which data is transmitted or received can be switched. What is referred to as the AV register has a structure like the one shown in FIG. 2.

FIG. 2A to FIG. 2D show the structures of an output master plug register (oMPR), an output plug control register (oPCR), an input master plug register (iMPR), and an input plug control register (iPCR) constituting the AV register. FIG. 2A shows the structure of the OPCR, FIG. 2B shows the structure of the OPCR, FIG. 2C shows the structure of the iMPR, and FIG. 2D shows the structure of the iPCR. A code indicating a maximum transmission rate at which isochronous data transmissible or receivable by the equipment is transmitted is specified in a data rate capability field of the OMPR or iMPR to which two most-significant bits are assigned. A channel number used to broadcast data is specified in a broadcast channel base field of the oMPR.

A value representing the number of output plugs included in the equipment, that is, the number of oPCRs included therein is specified in a number-of-output plugs field of the OMPR to which five least-significant bits are assigned. A value representing the number of input plugs included in the equipment, that is, the number of iPCRs included therein is specified in a number-of-input plugs field of the iMPR to which five least-significant bits are assigned. A non-persistent extension field and a persistent extension field are defined for future functional expansion.

The used state of a plug is specified in an online field of the OPCR or iPCR. Specifically, when a bit assigned to the online field is 1, the plug is online. When the bit is 0, the plug is offline. A value specified in a broadcast connection counter of the OPCR or iPCR indicates whether a broadcast connection is present (1) or absent (0). A value specified in a point-to-point connection counter of the OPCR or iPCR that is 6 bits wide indicates the number of point-to-point connections accommodated by the plug.

A value specified in a channel number field of the OPCR or iPCR that is 6 bits wide indicates a number of an isochronous channel assigned to data that can be treated by the plug. A value specified in a data rate field of the OPCR that is 2 bits wide indicates an actual transmission rate adopted for transmission of a packet of isochronous data output through the plug. A code specified in an overhead identity (ID) field of the OPCR that is 4 bits wide indicates a bandwidth assigned to an overhead that is appended for isochronous communication. A value specified in a payload field of the OPCR that is 10 bits wide indicates a maximum value of data contained in an isochronous packet that can be treated by the plug.

A case where the video camera 1 and monitor 4 -transfer data on a point-to-point basis has been described so far. As shown in FIG. 3, a plurality of pieces of equipment may be interconnected over an IEEE 1394 bus subordinately to the bridge 3, and multiple pieces of equipment may transfer data to or from multiple pieces thereof. This multi-points-to-multi-points communication will be described below. According to an example of a system configuration shown in FIG. 3, four video cameras 1-1 to 1-4 are connected to the bridge 3-1 over an IEEE 1394 bus (not shown), and four monitors 4-1 to 4-4 are connected to the bridge 3-2 over an IEEE 1394 bus.

In the system-configuration shown in FIG. 3, a connection has already been established between the video camera 1-1 and monitor 4-1, and image data is transferred at the isochronous channel 63. Furthermore, when image data is transmitted from the video camera 1-2 to the monitor 4-2, the video camera 1-2 sets an isochronous channel. At this time, the same isochronous channel as that already used will not be set. For example, an isochronous channel 62 is set.

A connection is established between the bridge 3-1 and bridge 3-2, and data transfer is started. The PVC mode is adopted as a communication mode. A VCI or VPI to be associated with the isochronous channel 62 is determined in advance. The bridge 3-2 determines an isochronous channel, at which received image data is transmitted, according to the VCI or VPI, and sets an AV plug. The bridge 3-2 selects, similarly to the bridge 3-1, an isochronous channel (for example, isochronous channel 62) that is not the same as an already used isochronous channel, converts the received data into data having the selected isochronous channel 62, and transmits the resultant data. The monitor 4-2 reproduces input image data.

As mentioned above, an isochronous channel is set so that it will not be the same as an already used one. Multi-points-to-multi-points communication is thus achieved. However, equipment interconnected over an IEEE 1394 bus (within a system) may include equipment that does not have the ability to set an isochronous channel. Moreover, the bridge 3 itself may not have the ability to switch isochronous channels. The present applicant has proposed in Japanese Patent Application No. 10-149538 and Patent Cooperation Treaty No. JP99/02864 a method of setting an isochronous channel using a separate personal computer or the like.

However, a personal computer or the like must be installed separately and used to set an isochronous channel. Otherwise, the aforesaid processing is not carried out. In other words, it is impossible to transfer different data on a point-to-point basis during multi-points-to-multi-points communication. Moreover, even when point-to-multi-points communication is intended, image data output from the video camera 1-1 is transmitted to all the monitors 4-1 to 4-4 at the same time. This is because different isochronous channels cannot be selected as mentioned above. In short, since data is transmitted at one isochronous channel, the same data cannot help being transmitted to all pieces of equipment connected to one bridge.

A case where a plurality of bridges is, as shown in FIG. 4, connected to one ATM switch 5 will be discussed below. For multicasting images produced by a video camera 1-1 to monitors 4-1 to 4-3 connected to bridges 3-2 to 3-4, all paths must be pre-set in the ATM switch 5. Pre-setting the paths is time-consuming. For example, when point-to-point communication is adopted instead of multicasting, if all paths leading to 70 pieces of equipment are set in the ATM switch, 2415 paths (=70×69/2) must be set. If paths were set in consideration of multicasting alike, the setting would be quite time-consuming.

When the PVC mode is adopted, if the total of pieces of equipment is modified because remote equipment is added or excluded, the setting of paths must also be modified.

SUMMARY OF THE INVENTION

The present invention intends to break through the foregoing situation. An object of the present invention is to construct a user-friendly system. Specifically, the switched virtual connection (SVC) mode is adopted so that different data items can be transferred through respective communications even during multi-points-to-multi-points communication. Moreover, equipment accommodated by the system can be utilized effectively.

According to the first aspect of the present invention, a communication control system includes a retrieving means and an output means. The retrieving means retrieves bridges, to which two pieces of equipment out of a plurality of pieces of equipment having received an instruction of connection or disconnection are connected, from a database containing predetermined information. The output means outputs a command, which enables execution of the instruction, to at least one of the bridges retrieved by the retrieving means.

An updating means may also be included for updating the information contained in the database according to information of new connection or disconnection sent from a bridge.

The information contained in the database may be at least one of identification names with which bridges are identified, node identification numbers of equipment connected to the bridges, ATM addresses of the bridges, IP addresses of the bridges, and information for management of connections established in a network.

A display control means may also be included for controlling a display presented on an operator screen, which is used to instruct connection or disconnection, according to the information contained in the database.

A plurality of pieces of equipment and a plurality of bridges may transfer data according to a first communication mode. The bridges may transfer data according to a second communication mode.

Data transfer to or from the database may be performed according to the second communication mode.

The first communication mode may be a communication mode conformable to the IEEE 1394, and the second communication mode may be the ATM.

ATM communication may be performed according to the SVC mode.

According to the second aspect of the present invention, a communication control method includes a retrieving step and an output step. At the retrieving step, bridges to which two pieces of equipment out of a plurality of pieces of equipment having received an instruction of connection or disconnection are connected are retrieved from a database containing predetermined information. At the output step, a command enabling execution of the instruction is output to at least one of the bridges retrieved at the retrieving step.

According to the third aspect of the present invention, a recording medium has a program stored therein. The program includes a retrieving step and an output step. At the retrieving step, bridges to which two pieces of equipment out of a plurality of pieces of equipment having received an instruction of connection or disconnection are connected are retrieved from a database containing predetermined information. At the output step, a command enabling execution of the instruction is output to at least one of the bridges retrieved at the retrieving step.

According to the fourth aspect of the present invention, a communication control system includes an acquiring means, a transmitting means and a setting means. The acquiring means acquires node identification numbers of a plurality of pieces of equipment. The transmitting means transmits the node identification numbers acquired by the acquiring means to other system accommodated by a network. The setting means sets a channel at which data is transmitted or received to or from equipment.

According to the fifth aspect of the present invention, a communication control method includes an acquiring step, a transmitting step, and a setting step. At the acquiring step, node identification numbers of a plurality of pieces of equipment are acquired. At the transmitting step, the node identification numbers acquired at the acquiring step are transmitted to other system accommodated by a network. At the setting step, a channel at which data is transmitted or received to or from equipment is set.

According to the sixth aspect of the present invention, a recording medium has a program stored therein. The program includes an acquiring step, a transmitting step, and a setting step. At the acquiring step, node identification numbers of a plurality of pieces of equipment are acquired. At the transmitting step, the node identification numbers acquired at the acquiring step are transmitted to other system accommodated by a network. At the setting step, a channel at which data is transmitted or received to or from equipment.

According to the seventh aspect of the present invention, a communication control system includes a requesting means, a display control means, and a reporting means. The requesting means requests acquisition of information concerning equipment accommodated by a network when a predetermined event occurs. The display control means controls a display presented on an operator screen, which is used to instruct connection or disconnection of equipment according to the information acquired in response to the request made by the requesting means. The reporting means reports information concerning equipment, of which connection or disconnection has been instructed, to other system according to the display presented on the operator screen and controlled by the display control means.

According to the eighth aspect of the present invention, a communication control method includes a requesting step, a display control step, and a reporting step. At the requesting step, acquisition of information concerning equipment accommodated by a network is requested when a predetermined event occurs. At the display control step, a display presented on an operator screen, which is used to instruct connection or disconnection of equipment, is controlled based on information acquired in response to the request made at the requesting step. At the reporting step, information concerning equipment whose connection or disconnection has been instructed is reported to other system according to the display presented on the operator screen and controlled at the display control step.

According to the ninth aspect of the present invention, a recording medium has a program stored therein. The program includes a requesting step, a display control step, and a reporting step. At the requesting step, acquisition of information concerning equipment accommodated by a network is requested when a predetermined event occurs. At the display control step, a display presented on an operator screen, which is used to instruct connection or disconnection of equipment, is controlled based on the information acquired in response to the request made at the requesting step. At the reporting step, information concerning equipment whose connection or disconnection has been instructed is reported to other system according to the display presented on the operator screen and controlled at the display control step.

According to the tenth aspect of the present invention, a communication system comprises communication control systems, a database, and a user interface. A bridge accommodated by a network includes an acquiring means, a first transmitting means, and a setting means. The acquiring means acquires node identification numbers of a plurality of pieces of equipment. The first transmitting means transmits the node identification numbers acquired by the acquiring means to a communication control system. The setting means sets a channel at which data is transmitted or received to or from equipment. The user interface includes a display control means and a second transmitting means. The display control means controls a display presented on an operator screen according to information contained in the database. The second transmitting means transmits information concerning equipment, of which connection or disconnection has been instructed, according to the display presented on the operator screen and controlled by the display control means. The communication control system includes a retrieving means, an output means, and an updating means. The retrieving means retrieves bridges, to which equipment is connected, from the database according to the information transmitted from the second transmitting means. The output means outputs a command, which enables execution of the instruction, to at least one of the bridges retrieved by the retrieving means. The updating means updates the information contained in the database according to information of new connection or disconnection sent from a bridge.

According to the fifteenth aspect of the present invention, a communication control method comprises a communication control method for a bridge, a communication control method for a user interface, and a communication control method for a communication control system. The communication control system for a bridge includes an acquiring step, a first transmitting step, and a setting step. At the acquiring step, node identification numbers of a plurality of pieces of equipment are acquired. At the first transmitting step, the node identification numbers acquired at the acquiring step are transmitted to a communication control system. At the setting step, a channel at which data is transmitted or received to or from equipment is set. The communication control method for a user interface includes a display control step and a second transmitting step. At the display control step, a display presented on an operator screen is controlled based on information contained in a database. At the second transmitting step, information concerning equipment whose connection or disconnection has been instructed is transmitted to a communication control system according to the display presented on the operator screen and controlled at the display control step. The communication control method for a communication control system includes a retrieving step, an output step, and an updating step. At the retrieving step, bridges to which equipment is connected are retrieved from the database according to the information transmitted at the second transmitting step. At the output step, a command enabling execution of the instruction is output to at least one of the bridges retrieved at the retrieving step. At the updating step, the information contained in the database is updated based on information of new connection or disconnection sent from a bridge.

According to the twelfth aspect of the present invention, a recording medium has a program stored therein. The program comprises a communication control program for a bridge, a communication control program for a user interface, and a communication control program for a communication control system. The communication control program for a bridge includes an acquiring step, a first transmitting step, and a setting step. At the acquiring step, node identification numbers of a plurality of pieces of equipment are acquired. At the first transmitting step, the node identification numbers acquired at the acquiring step are transmitted to a communication control system. At the setting step, a channel at which data is transmitted or received to or from equipment is set. The communication control program for a user interface includes a display control step and a second transmitting step. At the display control step, a display presented on an operator screen is controlled based on information contained in a database. At the second transmitting step, information concerning equipment whose connection or disconnection has been instructed is transmitted to a communication control system according to the display presented on the operator screen and controlled at the display control step. The communication control program for a communication control system includes a retrieving step, an output step, and an updating step. At the retrieving step, bridges to which equipment is connected are retrieved from the database according to the information transmitted at the second transmitting step. At the output step, a command enabling execution of the instruction is output to at least one of the bridges retrieved at the retrieval step. At the updating step, the information contained in the database is updated based on information of new connection or disconnection sent from a bridge.

In the communication control system according to the first aspect, the communication control method according to the second aspect, and the recording medium according to the third aspect, bridges to which two pieces of equipment out of the plurality of pieces of equipment having received an instruction of connection or disconnection are connected are retrieved from the database containing predetermined information. A command enabling execution of the instruction is output to at least one of the retrieved bridges.

In the communication control system according to the fourth aspect, the communication control method according to the fifth aspect, and the recording medium according to the sixth aspect, node identification numbers of the plurality of pieces of equipment are acquired, and transmitted to other system accommodated by the network. A channel at which data is transmitted or received to or from equipment is set.

In the communication control system according to the seventh aspect, the communication control method according to the eighth aspect, and the recording medium according to the ninth aspect, when a predetermined event occurs, information concerning equipment accommodated by the network is requested. The display presented on the operator screen, which is used to instruct connection or disconnection of equipment, is controlled based on the information acquired in response to the request. Information concerning equipment whose connection or disconnection has been instructed is transmitted to other system according to the display presented on the operator screen.

In the communication system according to the tenth aspect, the communication control method according to the eleventh aspect, and the recording medium according to the twelfth aspect, the bridge acquires node identification numbers of the plurality of pieces of equipment. The bridge then transmits the node identification numbers to a communication control system, and sets a channel at which data is transmitted or received to or from equipment. The user interface controls the display presented on the operator screen according to the information contained in the database. The user interface transmits information concerning equipment, of which connection or disconnected has been instructed, to a communication control system according to the display presented on the operator screen. The communication control system retrieves bridges, to which equipment is connected, from the database according to the transmitted information. The communication control system then outputs a command, which enables execution of the instruction, to at least one of the retrieved bridges, and updates the information contained in the database according to information of new connection or disconnection sent from a bridge.

BRIEF DESCRIPTION OF THE DRAWINGS

FIG. 2A to FIG. 2D show the structures of an OMPR, OPCR, iMPR, and iPCR;

FIG. 7 is a flowchart describing a procedure of system initialization;

FIG. 8 is an explanatory diagram concerning information contained in a database 14;

FIG. 12 shows another example of a display presented by the user interface 15;

FIG. 15 is an explanatory diagram concerning information to be placed in the database 14 when a connection is established;

FIG. 18 is an explanatory diagram concerning information to be placed in the database when a connection is established;

FIG. 23 is an explanatory diagram concerning information to be placed in the database 14 when a connection is established.

DESCRIPTION OF THE PREFERRED EMBODIMENTS

Figure 1:
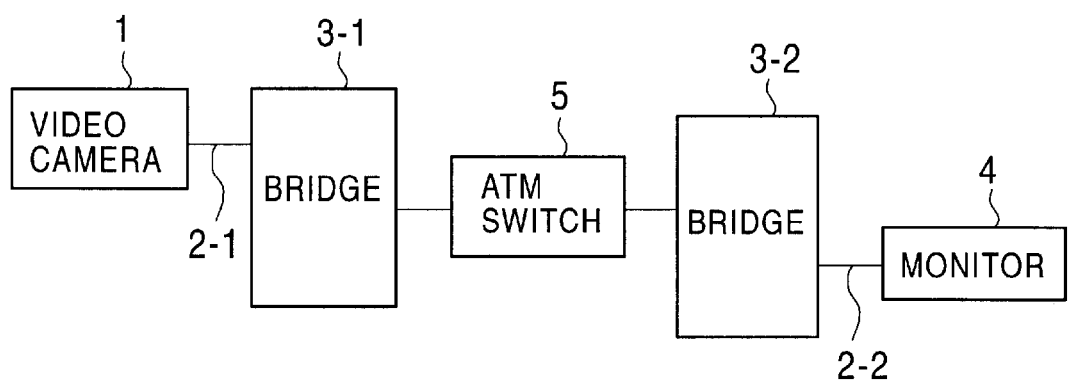
FIG. 1 shows the configuration of a conventional network system.
Figure 3:
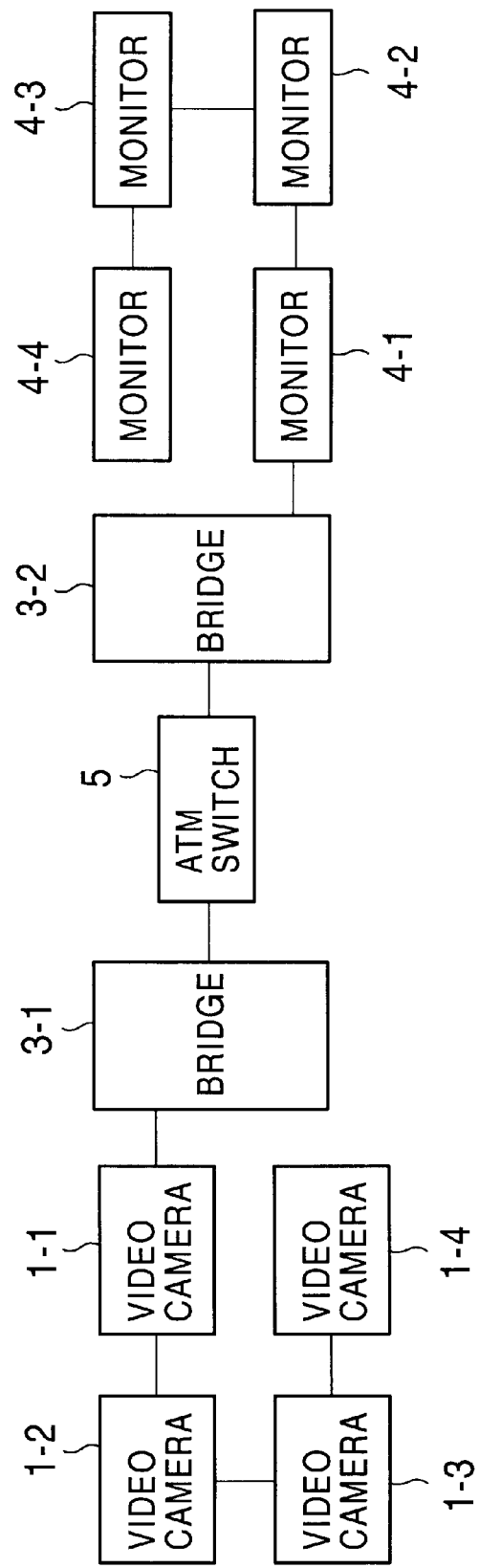
FIG. 3 shows another configuration of a network system.
Figure 4:
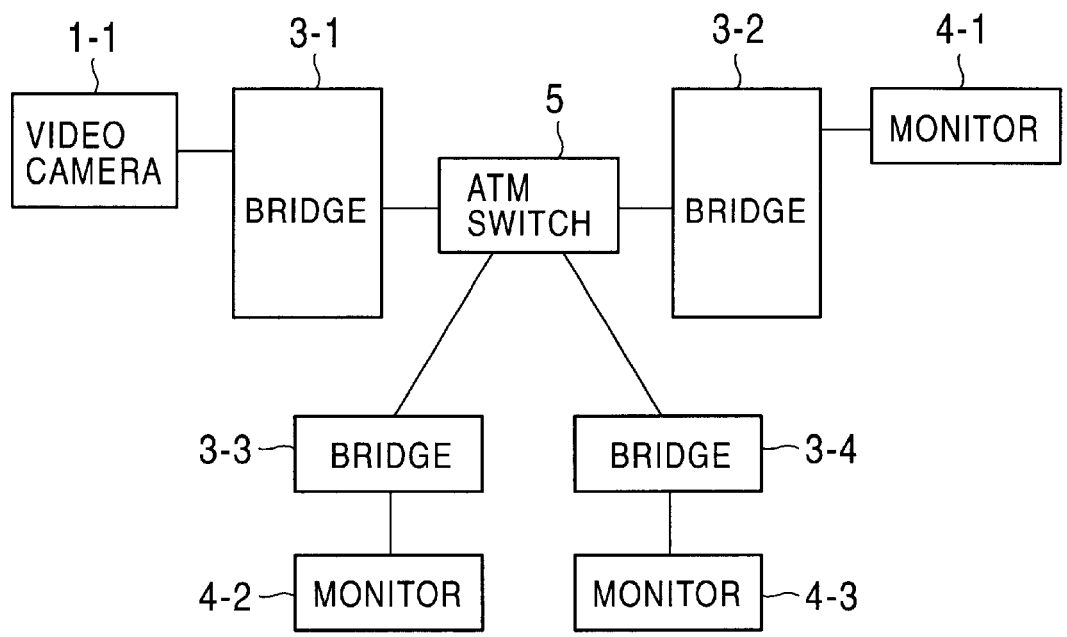
FIG. 4 shows still another configuration of a network system.
Figure 5:
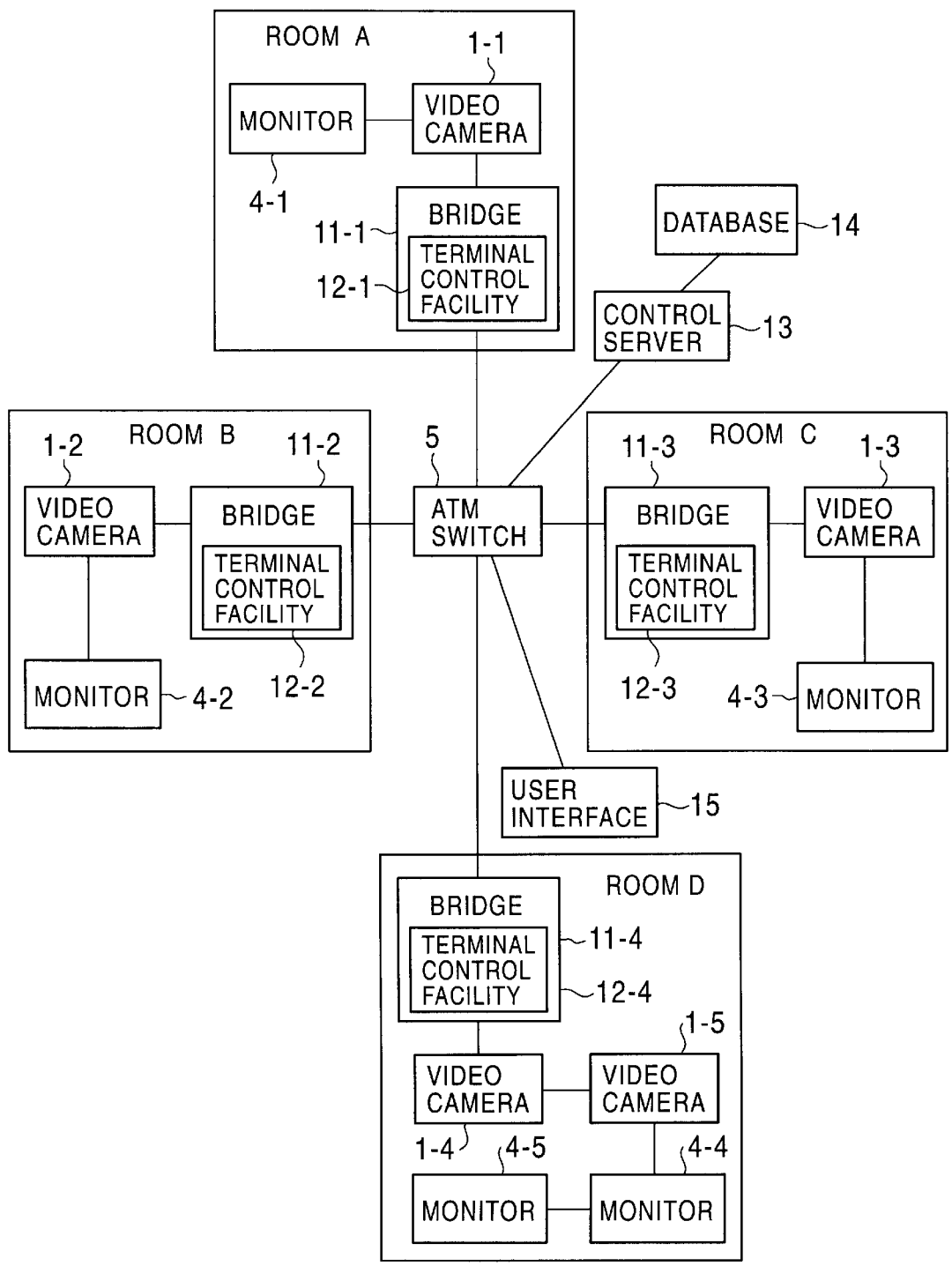
FIG. 5 shows the configuration of a network system in which the present invention is implemented.

FIG. 5 shows the configuration of a system for transferring data placed on an IEEE 1394 fast serial bus over an ATM network in accordance with an embodiment of the present invention. The system shown in FIG. 5 includes four rooms A to D in which bridges 11-1 to 11-4 are installed. The bridges 11-1 to 11-4 have terminal control facilities 12-1 to 12-4 incorporated therein, and are connected to an ATM switch 5. A control server 13 and a user interface 15 are connected to the ATM switch 5. A database 14 is connected to the control server 13.

In the room A, a video camera 1-1, a monitor 4-1, and the bridge 11-1 are interconnected over an IEEE 1394 bus. Likewise, in the rooms B and C, a video camera 1-2 (1-3), a monitor 4-2 (4-3), and the bridge 11-2 (11-3) are interconnected over an IEEE 1394 bus. In the room D, video cameras 1-4 and 1-5, monitors 4-4 and 4-5, and the bridge 11-4 are interconnected over an IEEE 1394 bus.

Figure 6:
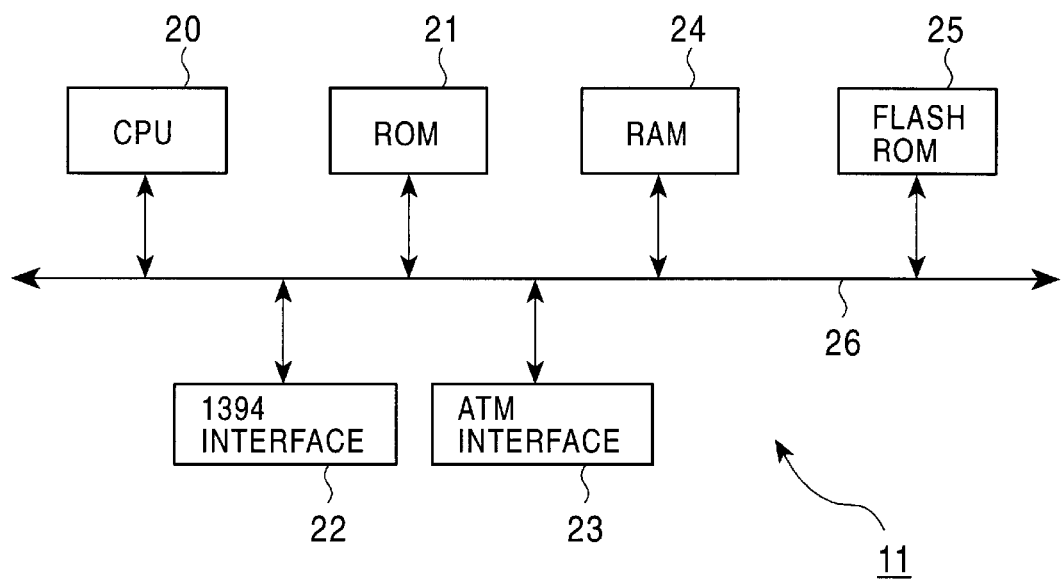
FIG. 6 shows the configuration of a bridge 11.

FIG. 6 is a block diagram showing the internal configuration of the bridge 11. A central processing unit (CPU) 20 performs predetermined processing according to a program stored in a read only memory (ROM) 21. The predetermined processing includes, for example, the processing of converting isochronous data input through an IEEE 1394 interface 22 into data of an ATM form (packet), and transmitting the resultant data to the ATM switch 5 (FIG. 5) through an ATM interface 23. Data necessary to perform such processing is stored in a random access memory (RAM) 24. Data including different identification numbers of equipment and IP addresses is stored in a flash ROM 25. These devices are interconnected over an internal bus 26.

The bridge 11 has the terminal control facility 12 incorporated therein. The terminal control facility 12 is realized with control given by the CPU 20 according to the program stored in the ROM 21. The terminal control facility 12 has the ability to communicate with the control server 13 according to, for example, the TCP/IP (IP over ATM). The terminal control facility 12 asynchronously communicates with equipment connected subordinately to the bridge 11. The terminal control facility 12 then reads an identification number of equipment, rewrites data concerning an AV plug, or instructs reproduction or stoppage. Moreover, the terminal control facility 12 monitors equipment connected to the bridge 11 over the IEEE 1394 bus. When an event such as a bus reset occurs, the terminal control facility 12 transmits the information to the control server 13.

The bridge 11 has, in addition to the abilities of the terminal control facility 12, the ability to transmit an ATM data stream concurrently to a plurality of other bridges by copying cells (multicasting). Moreover, the bridge 11 stores connection management information in the RAM 24 and discontinues a connection if necessary. Besides, the bridge 11 performs ATM communication according to the SVC mode, and establishes a connection to another bridge 11. Hereinafter, unless otherwise mentioned, processing that is actually performed by the terminal control facility 12 will be described to be carried out by the bridge 11.

The control server 13 has the ability to communicate with the bridge 11 and user interface 15. Moreover, the control server 13 writes predetermined information in the database 14 or reads predetermined information therefrom. The information contained in the database 14 will be detailed later. For example, a connected state between the bridge 11 and equipment conformable to the IEEE 1394 and connected to the bridge 11, and a connected state between bridges 11 are contained in the database 14. The control server 13 is realized with, for example, a personal computer. The database 14 may be realized with a hard disk incorporated in the personal computer. As long as data can be transferred (communicated), the control server 13 and database 14 may be realized in any form.

The user interface 15 has the ability to report the connected state of the system to a user, and is realized with, for example, a personal computer. Consequently, the control server 13 and user interface 15 may be, as shown in FIG. 5, realized as stand-alone apparatuses, or the user interface 15 may be unified with the control server 13. A user uses the user interface 15 to instruct data transfer between desired equipment. The user interface 15 has an operator console including a keyboard and a mouse (not shown) to be manipulated by a user, and a display device (not shown) on which system information is displayed.

Next, actions to be performed in the system shown in FIG. 5 will be described. To begin with, a procedure of system initialization will be described with reference to the flowchart of FIG. 7. A case where the bridge 11-1 in the room A is activated will be described as an instance. At step S11, the bridge 11-1 is activated because a user turns on the power supply. At step S12, the bridge 11-1 inquires of the video camera 1-1 about a node identification number. At step S13, the video camera 1-1 transmits the node identification number thereof to the bridge 11-1 in response to the inquiry about the node identification number.

At step S14, the bridge 11-1 having received the node identification number of the video camera 1-1 inquires of the monitor 4-1 about a node identification number. At step S15, the monitor 4-1 transmits the node identification number thereof to the bridge 11-1 in response to the inquiry about the node identification number. The bridge 11-1 inquires of all pieces of equipment interconnected over the IEEE 1394 bus about their node identification numbers. The bridge 11-1 thus acquires the node identification numbers of all the pieces of equipment. In the system shown in FIG. 5, only the video camera 1-1 and monitor 4-1 are connected to the bridge 11-1. When having acquired the node identification numbers of these two pieces of equipment, the bridge 11-1 judges that it has acquired the node identification numbers of all pieces of equipment connected, and transmits the results of acquisition to the control server 13 at step S16.

The control server 13 interprets processing performed by the bridge 11-1 at step S16 as follows: the bridge 11-1 has issued a request for registration of own information. The control server 13 updates the information contained in the database 14 with the information received from the bridge 11-1 and including a list of equipment. The bridges 11-2 to 11-4 also perform the processing. Consequently, information of all pieces of equipment accommodated by the system is contained in the database 14.

The processing described in the flowchart of FIG. 7 is also performed when equipment connected to a predetermined bridge 11 is changed and a bus reset occurs. The database 14 therefore contains up-to-date information of the system all the time.

FIG. 8 shows information contained in the database 14 when the bridges 11-1 and 11-2 are involved in the foregoing processing (only the bridges 11-1 and 11-2 are activated). Table 1 indicates the relationship of correspondence between identification names of bridges and IP addresses thereof. In the example shown in FIG. 8, a bridge having an identification name "bridge 11-1" has an IP address "192.168.0.1," and a bridge having an identification name "bridge 11-2" has an IP address "192.168.0.2."

Table 2 indicates the relationship of correspondence between identification names of bridges and ATM addresses thereof. In the example shown in FIG. 8, a bridge having an identification name "bridge 11-1" has an ATM address "47.00.11 . . . 00.00," and a bridge having an identification name "bridge 11-2" has an ATM address "47.00.11 . . . 01.00."

Table 3 indicates the relationship of correspondence between identification names of bridges and node identification numbers of equipment connected to the bridges. Two pieces of equipment, that is, the video camera 1-1 and monitor 4-1 are connected to the bridge 11-1. "08004601 0010001" and "08004601 0010002" are registered as node identification numbers. Likewise, the node identification numbers of two pieces of equipment are registered in association with the bridge 11-2.

Table 4 is a table used to manage connections. Since no connection has been established, no information is listed in the table.

Next, a case where two pieces of equipment accommodated by the system are connected to each other (a connection is established), or more particularly, the video camera 1-1 and monitor 4-2 are connected to each other will be described with reference to the flowcharts of FIG. 9 and FIG. 10. When the power supply of the user interface 15 has been turned on, or when a user has entered a predetermined instruction, the user interface 15 requests the control server 13 to transmit information concerning a list of equipment accommodated by the system at step S21. In response to the request for the equipment list, the control server 13 inquires of the database 14 about the information of the equipment list.

In response to the inquiry made by the control server 13, the database 14 returns the results of retrieval of the information of the equipment list to the control server 13 at step S23. The control server 13 transfers the information of the equipment list received from the database 14 to the user interface 15 at step S24. At step S25, the user interface 15 displays the list on a display device according to a predetermined form, and thus provides a user with the information of the list of equipment accommodated by the system.

Figure 11:
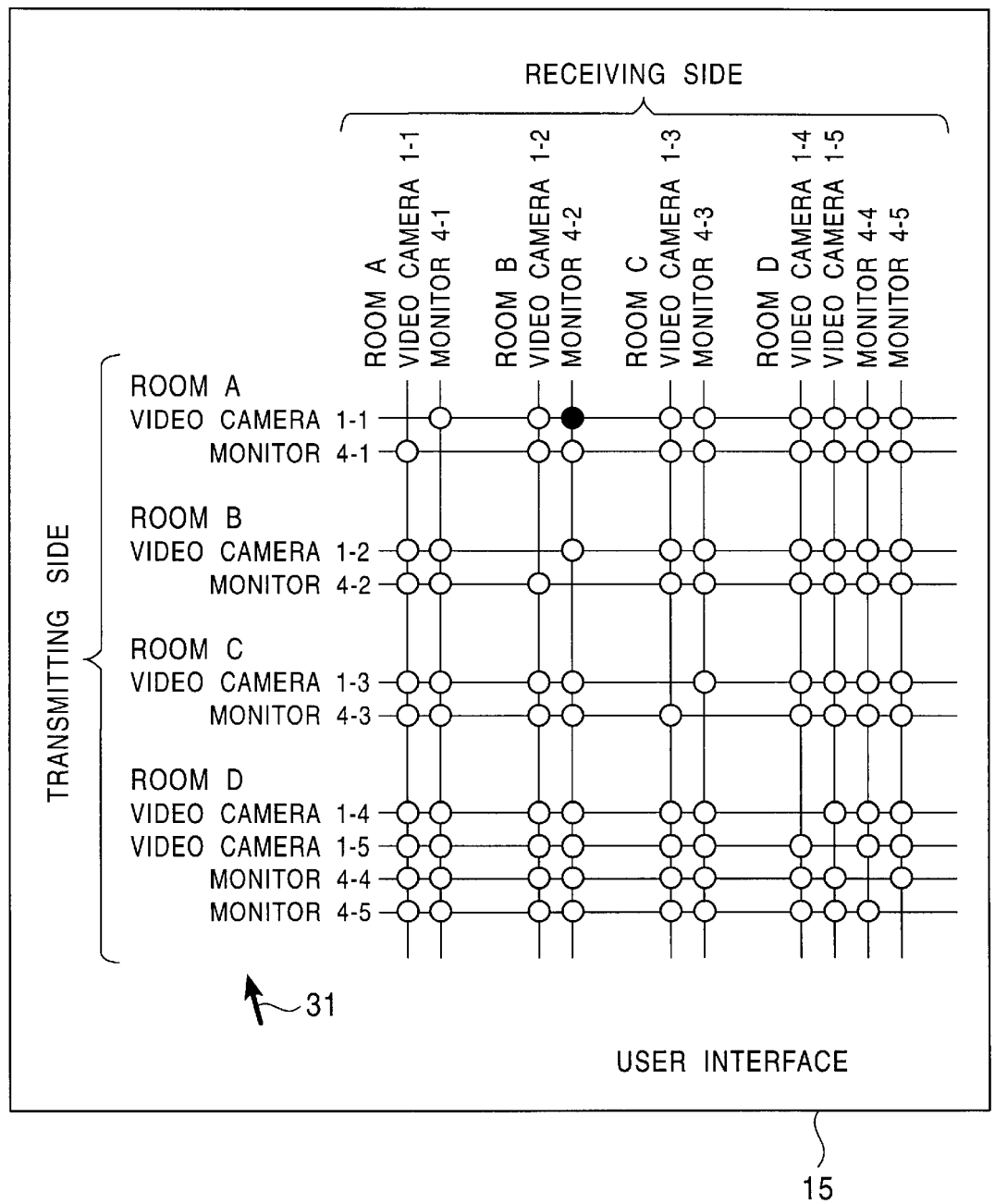
FIG. 11 shows an example of a display presented by a user interface 15.

FIG. 11 shows an example of a display presented on the screen of the user interface 15. Equipment that may act as a data transmitting side is listed lengthwise (in the left part of the drawing), and equipment that may act as a data receiving side for receiving data from the transmitting side is listed sideways (in the upper part thereof). A white circle is displayed at an intersection between a lateral line drawn relative to one piece of equipment and a vertical line drawn relative to another piece of equipment. No white circle is displayed at an intersection between a lateral line and vertical line drawn relative to the same piece of equipment. This is intended to help avoid a case where the same piece of equipment as a piece of equipment for transmitting data is selected as equipment for receiving the data. When data transfer between video cameras does not make sense (because, for example, the video cameras have only the ability to produce images), no white circle may be displayed at an intersection between a lateral line and vertical line drawn relative to the video cameras.

A user manipulates a cursor 31 to select a white circle displayed at an intersection between a line drawn relative to one piece of equipment for transmitting data and a line drawn relative to another piece of equipment for receiving data from among all the displayed white circles. The selected white circle is changed to, for example, a black circle in order to indicate that the circle has been selected. In the example shown in FIG. 11, a white circle displayed at an intersection between a line drawn relative to the video camera 1-1 acting as a transmitting side and a line drawn relative to the monitor 4-2 acting as a receiving side has been selected and then changed to a black circle.

FIG. 12 shows another example of a display presented by the user interface 15. A display used to select equipment acting as a transmitting side is presented on an upper part of a screen, and a display used to select equipment acting as a receiving side is presented on a lower part thereof. In the case of this screen, a transmitting side and a receiving side are selected separately. In the example shown in FIG. 12, the video camera 1-1 and monitor 4-2 have been selected as a transmitting side and receiving side respectively using the cursor 31. The selected equipment is indicated with an allocated area of the screen hatched or with characters highlighted in a different color in order to discriminate it from the other equipment.

Once equipment acting as a transmitting side has been selected, equipment that cannot be selected as a receiving side because of the selected equipment may be indicated with characters displayed obscurely in order to inform a user of the fact that the equipment cannot be selected.

Figure 13A:
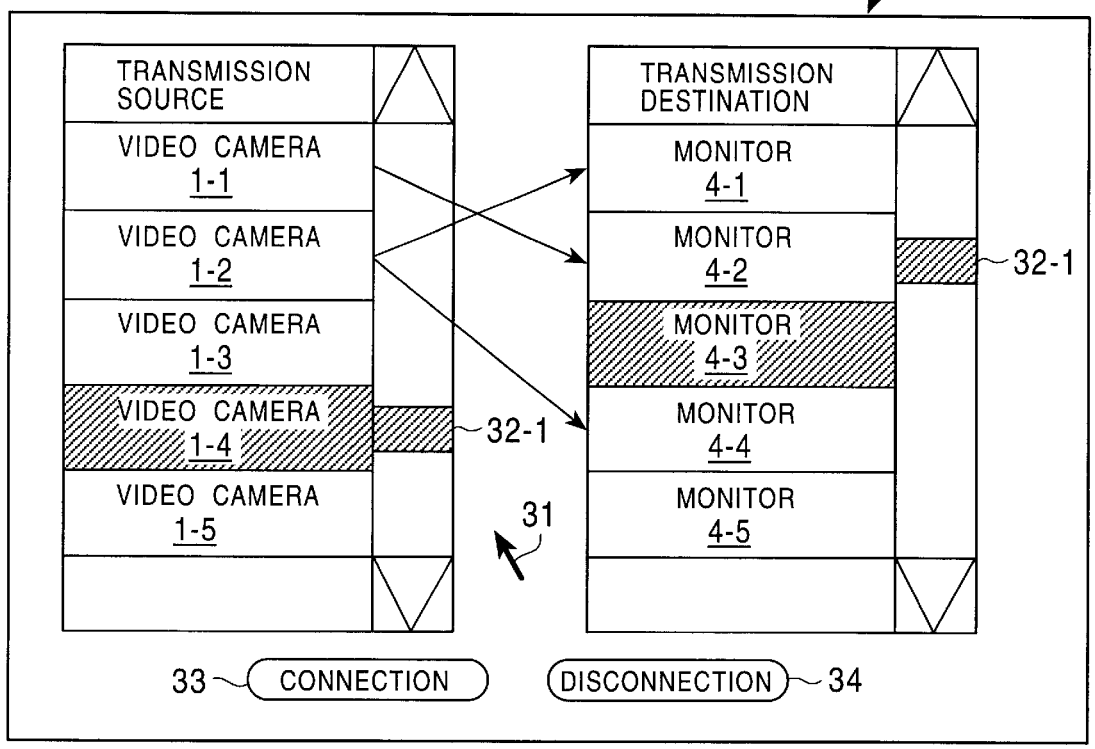
FIGS. 13A and 13B show still another example of a display presented by the user interface 15.
Figure 13B:
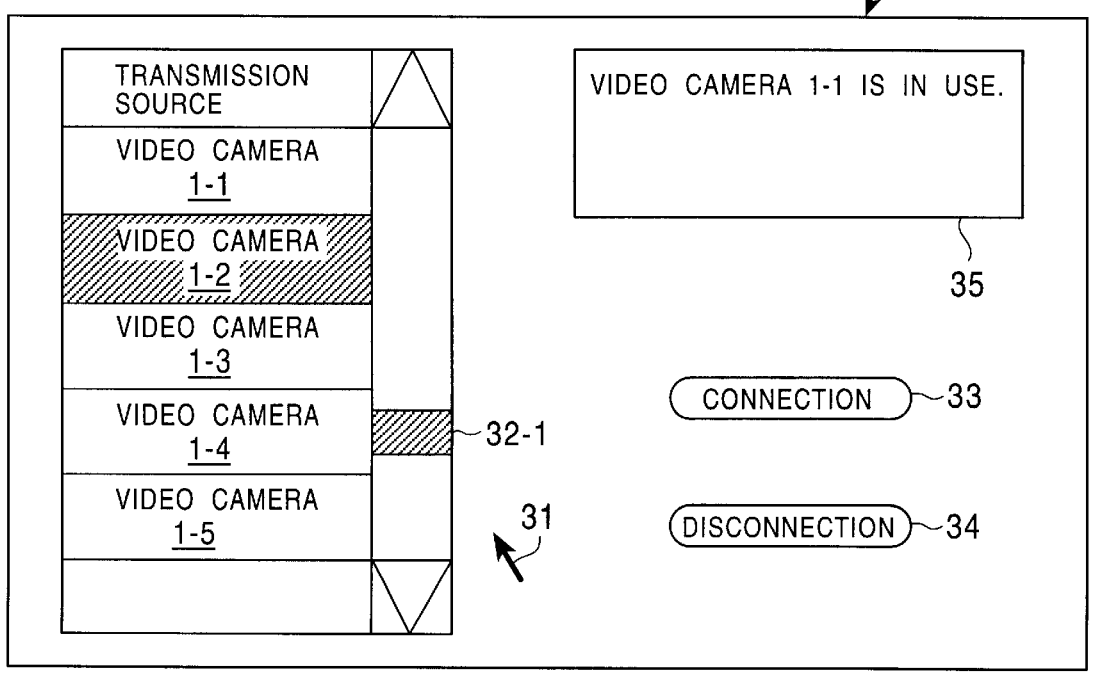

FIG. 13A and FIG. 13B show still another examples of a display presented by the user interface 15. FIG. 13A shows an example of a display presented when the user interface 15 is installed in a room different from the rooms A to D. FIG. 13B shows an example of a display presented when the user interface 15 is installed in a predetermined room among the rooms A to D. In the example shown in FIG. 13A, equipment that may act as a transmission source (cameras 1-1 to 1-5) is indicated on the left part of the screen. Equipment that may act as a transmission destination (monitors 4-1 to 4-5) is indicated on the right part thereof. A bar 32-1 or 32-2 is manipulated in order to indicate equipment that has not been indicated.

In the example shown in FIG. 13A, a user uses the cursor 31 to manipulate the bar 32-1 and thus attains a state in which desired equipment is indicated as a transmission source. When the desired equipment has been indicated, the cursor 31 is moved to characters representing the equipment and then clicked. Otherwise, any other predetermined manipulation is performed. The thus selected equipment is indicated with the characters highlighted in a different color or with an allocated area of the screen hatched so that it can be discriminated from the other pieces of equipment. In FIG. 13A, the video camera 1-4 has been selected and indicated with an allocated area of the screen hatched.

Likewise, equipment desired as a transmission destination is indicated by manipulating the bar 32-2, and thus selected. After selecting the transmission source and destination, the user presses a connection button 33 to connect the selected equipment to each other. The equipment whose connection has been instructed is, as shown in FIG. 13A, indicated with an arrow. In FIG. 13A, the video camera 1-1 and monitor 4-2, the video camera 1-2 and monitor 4-1, and the video camera 1-2 and monitor 4-4 have been instructed to be connected to each other.

The thus connected equipment is disconnected with a press of a disconnection button 34. Similarly to the manipulations performed to establish a connection, equipment acting as a transmission source whose connection must be discontinued, and equipment acting as a transmission destination are selected, and the disconnection button 34 is then pressed.

FIG. 13B shows an example of a display presented when, for example, the user interface 15 is installed in the room B, and the monitor 4-2 existent in the room B is designated as a transmission destination. The transmission destination has been designated on the screen of the user interface 15. A list of equipment that may act as a transmission destination is therefore not displayed. Only a list of equipment that may act as a transmission source is displayed on the left part of the screen. A user uses the cursor 31 to manipulate the bar 32-1 so that equipment desired as a transmission source will be indicated. The desired equipment is then selected as a transmission source from among pieces of equipment indicated. In FIG. 13B, the video camera 1-2 has been selected and indicated with an allocated area of the screen hatched so that it can be discriminated from the other pieces of equipment.

After thus selecting desired equipment, for establishing a connection to the equipment, the user presses the connection button 33. For discontinuing the connection to the equipment, the user presses the disconnection button 33. In FIG. 13B, a comment display field 35 is defined in the upper right part of the screen. In the comment display field 35, an acting situation of a transmission source is indicated with, for example, "Video camera 1-1 is in use." displayed.

Hereinafter, a description will be made on the assumption that the display shown in FIG. 11 is presented on the operator screen of the user interface 15. Referring back to the flowchart of FIG. 9, at step S25, the display shown in FIG. 11 is presented. A user selects two pieces of equipment, which should be connected to each other, on the screen at step S26. As mentioned above, the user manipulates a white circle displayed at an intersection between a line drawn relative to equipment desired as a transmitting side and a line drawn relative to equipment desired as a receiving side, and thus selects the two pieces of equipment. A description will be made by taking for instance a case where the video camera 1-1 is, as shown in FIG. 11, selected as a transmitting side and the monitor 4-2 selected as a receiving side.

When the user has selected two desired pieces of equipment at step S26, the user interface 15 reports the results of selection (node identification numbers of the selected pieces of equipment) to the control server 13 at step S27. The control server 13 instructs the database 14 to retrieve data indicating bridges 11 to which two selected pieces of equipment (video camera 1-1 and monitor 4-2) are connected.

In response to the instruction issued from the control server 13, the database 14 retrieves the bridges 11 to which the video camera 1-1 and monitor 4-2 are connected. As described with reference to FIG. 8, tables 1 to 4 are contained in the database 14. Table 3 is referenced in order to retrieve the bridges 11, to which the pieces of equipment are connected, in association with the node identification numbers. At step 29, the database 14 transmits the results of retrieval to the control server 13. In this case, the results of retrieval indicating that the video camera 1-1 is connected to the bridge 11-1 and the monitor 4-2 is connected to the bridge 11-2 are transmitted to the control server 13.

The control server 13 issues an instruction, which indicates that an instructed connective relationship should be attained, to the bridge 11-1 at step S30 (transmits a command). In this case, an instruction is output to indicate that a connection should be established between the video camera 1-1 and monitor 4-2 and image data produced by the video camera 1-1 should be transmitted to the monitor 4-2. In response to the instruction issued from the control server 13, the bridge 11-1 to which the video camera 1-1 is connected cooperates with the video camera 1-1 in setting an isochronous channel, at which image data is transmitted, at step S31. Referring to the flowchart of FIG. 14, a description will be made of how the bridge 11-1 sets an isochronous channel.

As a precondition, the bridge 11-1 stores unavailable isochronous channels in a memory. Information concerning the isochronous channels is initialized and cleared with the power supply turned on.

For setting an isochronous channel, the bridge 11-1 checks the leading item of a stored list of isochronous channels at step S51. It is judged at step S52 whether a channel number specified in the leading item is a number of an available channel. If it is judged at step S52 that the channel number is not a number of an available channel, control is passed to step S53. It is then judged whether all the channel numbers ending with the last channel number have been checked to see if they are numbers of available channels (processing of step S52). If it is judged at step S53 that all the channel numbers ending with the last one have not been checked, control is passed to step S54. A number next to the channel number being checked is set as a new channel number to be checked, and control is returned to step S52. The subsequent processing is then repeated.

If it is judged at step S53 that all the channel numbers ending with the last one have been checked, control is passed to step S55. When it says that all the channel numbers ending with the last one have been checked, it means that all channel numbers set in the bridge 11-1 are numbers of unavailable channels. At step S55, therefore, a value indicating that an available channel is absent is returned. When the value indicating that an available channel is absent is returned, the bridge 11-1 informs the control server 13 of the fact. The control server 13 informs the user interface 15 of the fact. The user interface 15 displays a message saying, for example, "Bridge 11-1 has failed to get a channel." Thus, a user becomes aware of the fact that a connection cannot be established.

If it is judged at step S52 that a channel number being checked is a number of an available channel, control is passed to step S56. The information of the list is rewritten to indicate that the channel number being checked is a number of an unavailable channel. At step S57, the channel number that has rewritten as a number of an unavailable channel is returned as an available channel number. In other words, at step S31 (FIG. 9), the bridge 11-1 sets the channel number as an isochronous channel at which data is transmitted.

As mentioned above, the bridge 11-1 retrieves an available channel number and assigns the channel to transmission data for fear the data may collide with another data. At step S31, the bridge 11-1 sets an isochronous channel at which data is transmitted. At step S32, the bridge 11-1 issues a request for establishment of an ATM connection to the bridge 11-2 to which the monitor 4-2 is connected.

Figure 10:
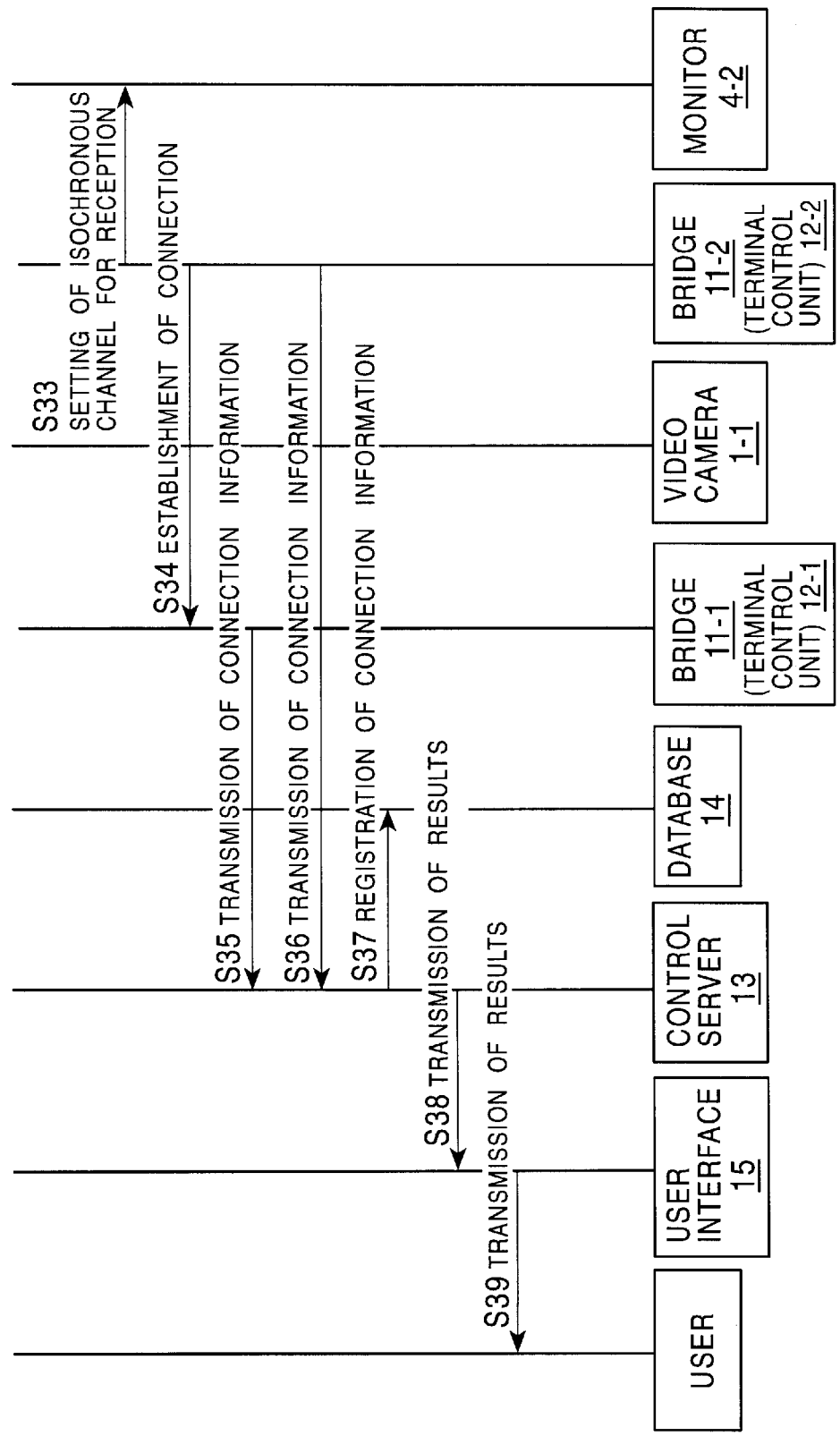
FIG. 10 is a flowchart continuing the one of FIG. 9.

When having received the connection request from the bridge 11-1, the bridge 11-2 cooperates with the monitor 4-2 in setting an isochronous channel at which data is received so as to grant the request at step S33 (FIG. 10). Setting an isochronous channel is carried out as described with reference to the flowchart of FIG. 14. An isochronous channel set by the bridge 11-1 and an isochronous channel set by the bridge 11-2 may be identical to each other or different from each other, and are anyhow determined mutually independently.

At step S34, the bridge 11-2 informs the bridge 11-1 of the fact that a connection has been established. When having recognized that a connection to the bridge 11-2 has been established, the bridge 11-1 transmits a connection identification number and isochronous channel number to the control server 13 at step S35. Likewise, the bridge 11-2 transmits a connection identification number and isochronous channel number to the control server 13 at step S36. What is referred to as a connection identification number is an identification number with which a connection is identified internally of each bridge 11.

The bridge 11-1 and bridge 11-2 each store the connection identification number and isochronous channel number, which are sent to the control server 13, and connection information such as an VCI or VPI in the incorporated RAM 24 thereof.

The information thus transmitted to the control server 13 is transferred to the database 14 and contained (to update) at step S37. FIG. 15 shows tables 1 to 4 thus contained in the database 14. In FIG. 15, tables 1 to 4 contain information acquired with the system configured as shown in FIG. 5. Namely, information of the bridges 11-1 to 11-4 is listed in each table.

When a connection is established through the aforesaid processing, table 4 is updated. The example of table 4 shown in FIG. 15 has as information of a data outputting side "08004601 010001" specified for a node identification number of equipment (video camera 1-1). Moreover, "1" is specified for a connection identification number, "0" is specified for a leaf identification number, and "62" is specified for an isochronous channel. Likewise, as information of a data inputting side, "08004601 030002" is specified for a node identification number of equipment (monitor 4-2), "2" is specified for a connection identification number, "0" is specified for a leaf identification number, and "61" is specified for an isochronous channel.

At step S37, updated table 4 is contained in the database 14. At step S38, the control server 13 informs the user interface 15 of the fact that updating the table contained in the database 14 has succeeded. At step S39, the user interface 15 informs a user of the fact that connection has succeeded (a connection is established). For instance, in the example of a display presented by the user interface 15 shown in FIG. 11, when a user designates a predetermined white circle, the white circle is changed to a black one. Furthermore, when connection succeeds, the black circuit is changed to a circle of any other color. Otherwise, the black circle remains black, and a message saying that connection has succeeded is displayed for a predetermined period of time.

Herein, a predetermined message saying that connection has been completed shall be displayed, though it is not illustrated. A display like the one shown in FIG. 11 shall be presented (a black circle is displayed at an intersection between lines drawn relative to connected pieces of equipment). Thus, the video camera 1-1 and monitor 4-2 are connected to each other. In this state, when a user enters an instruction indicating that the video camera 1-2 and monitor 4-3 should be connected to each other, that is, when the processing of step S26 in the flowchart of FIG. 9 is executed, processing of step S26 and thereafter is carried out. Thus, the connection is established.

Figure 17:
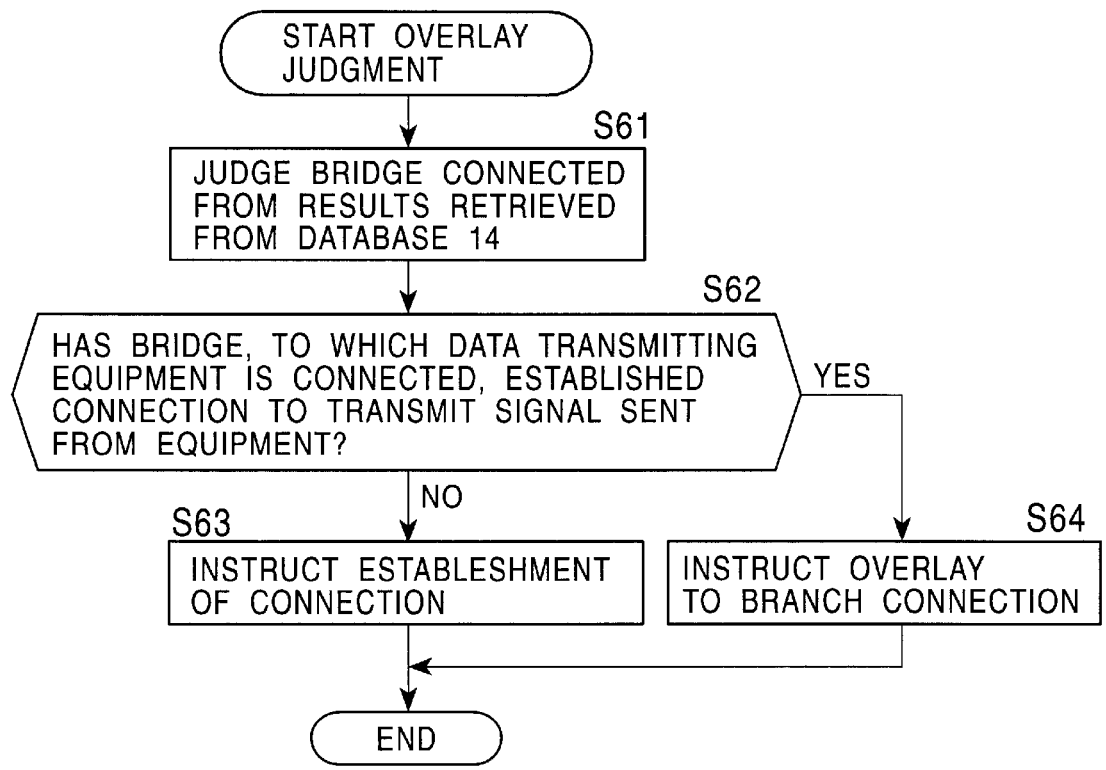
FIG. 17 is a flowchart describing overlay judgment.

When a connection has been established within the system (connection information is listed in table 4), if it is instructed to establish a new connection, additional processing must be inserted between step S29 and S30. The additional processing is to judge whether a new connection will be an overlay. Referring to the flowchart of FIG. 17, a description will be made of how the control server 13 judges whether a new connection will be an overlay.

At step S61, the control server 13 judges from the results of retrieval received from the database 14 at step S29 what are bridges to which two pieces of equipment between which a new connection will be established are connected. In this case, the bridge 11-2 is judged a bridge to which the video camera 1-2 is connected. The bridge 11-3 is judged a bridge to which the monitor 4-3 is connected. The control server 13 judges from the information of table 4 contained in the database 14 whether a connection allowing a bridge (bridge 11-2), to which equipment acting as a data transmitting side is connected, to transmit a signal received from the equipment (video camera 1-2) has already been established.

In this case, no signal has been output from the video camera 1-2 connected to the bridge 11-2 to any other equipment. Control is therefore passed to step S63. The control server 13 issues an instruction, which indicates that a new connection should be established, to the bridge 11-2 (corresponding to the processing of FIG. 30 in FIG. 9).

If it is judged at step S62 that a signal is output from the video camera 1-2 to any other equipment, control is passed to step S64. The bridge 11-2 is then instructed to overlay a connection overlaying is such that an already established connection is branched to establish new connections. The overlaying will be detailed later.

Assuming that a connection has thus been established between the video camera 1-2 (bridge 11-2) and the monitor 4-3 (bridge 11-3) through the foregoing processing, tables 1 to 4 contained in the database 14 provide the information shown in FIG. 18. Since a new connection has been established, table 4 is updated and information of the new connection is added.

Figure 14:
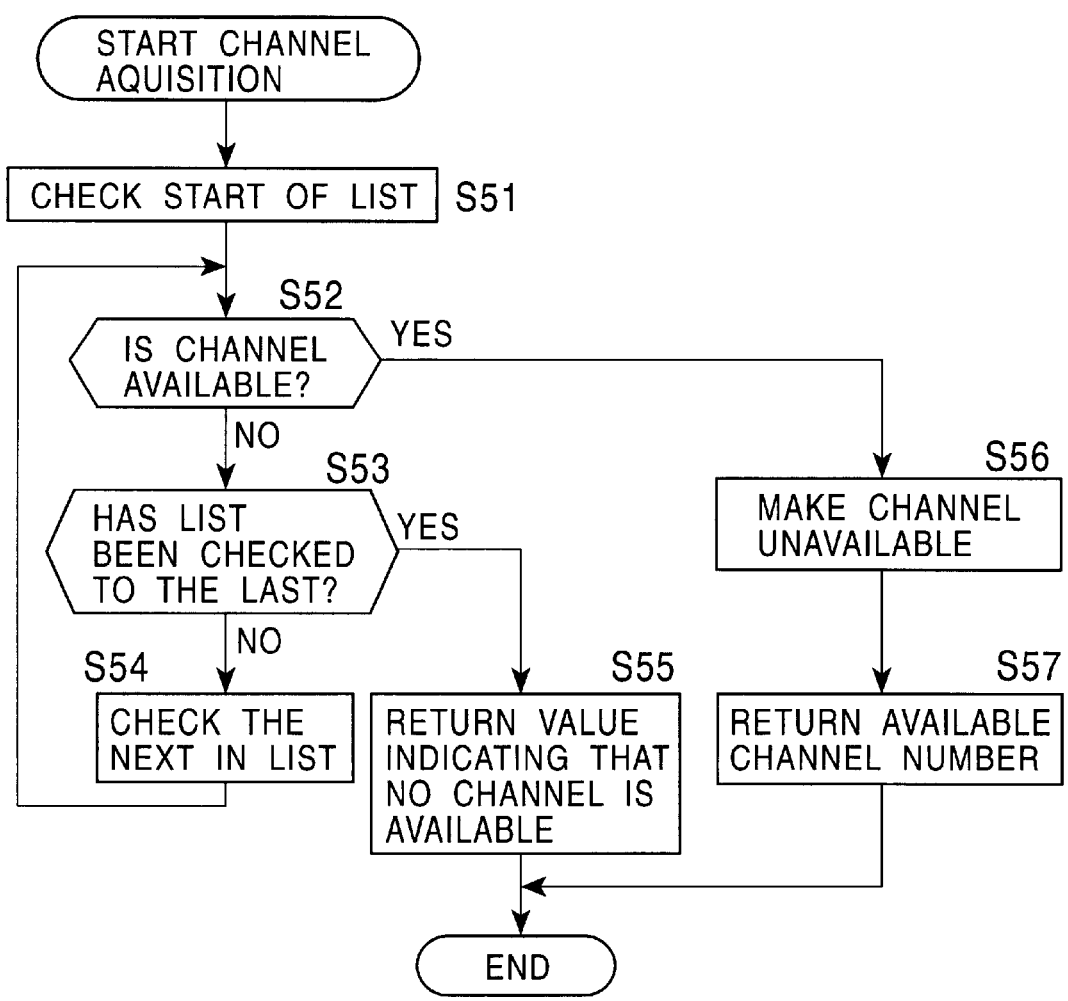
FIG. 14 is a flowchart describing isochronous channel acquisition.

As seen from table 4 shown in FIG. 18, isochronous channel numbers assigned to data transmitting sides are mutually different, that is, "62" and "61." Moreover, isochronous channel numbers assigned to data inputting sides are mutually different, that is, "61" and "60." When isochronous channels are set in this way, it means that the bridges 11 have carried out the processing described in the flowchart of FIG. 14, and then assigned different channels to the respective pieces of equipment. It will therefore not take place that data items transmitted from the pieces of equipment collide with each other.

Figure 16:
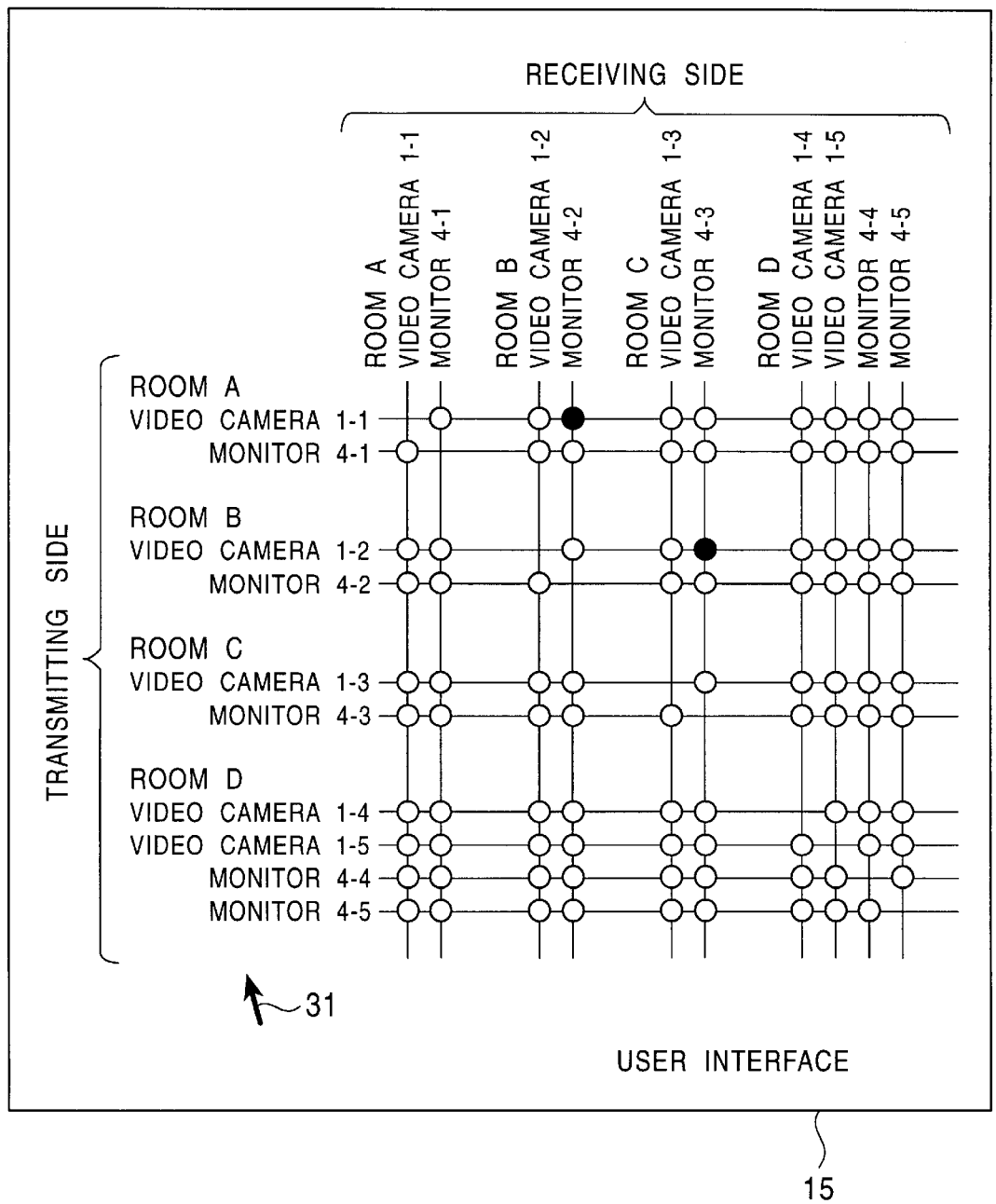
FIG. 16 shows an example of a display presented by the user interface 15.
Figure 19:
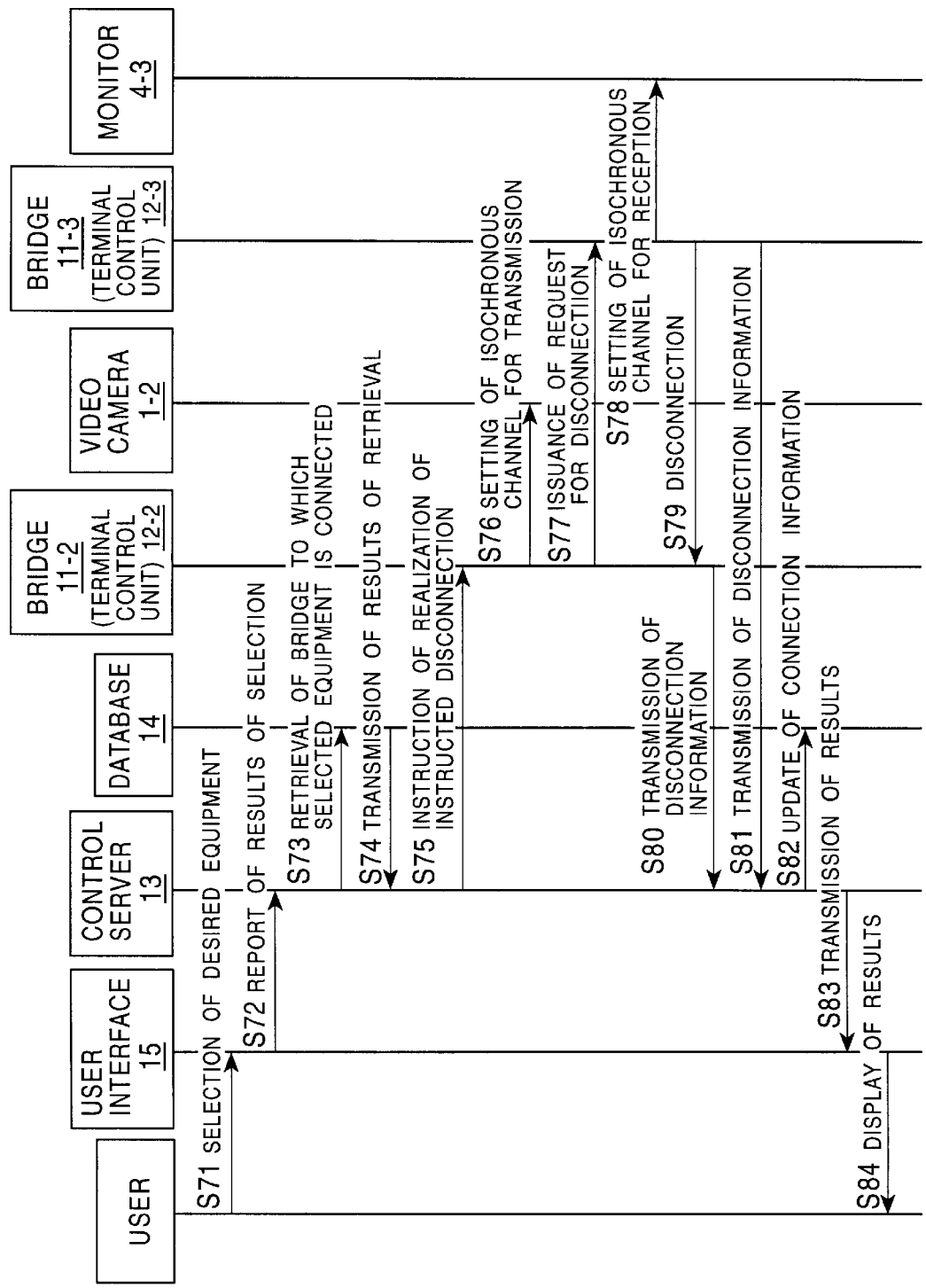
FIG. 19 is a flowchart describing disconnection.

Referring to the flowchart of FIG. 19, a description will be made of a case where when the video camera 1-1 and monitor 4-2, and the video camera 1-2 and monitor 4-3 are connected to each other, the connection between the video camera 1-2 and monitor 4-3 is discontinued (the video camera 1-2 and monitor 4-3 are disconnected). Assume that a display like the one shown in FIG. 16 is presented on the screen of the user interface 15. Such a display presenting connected states may always be presented on the screen of the user interface 15, or may be presented only when a predetermined manipulation is performed or an event occurs. Assume that the display is presented when the predetermined manipulation is performed or an event occurs. In this case, when the processing from step S21 to step S25 described in the flowchart of FIG. 9 is carried out, the display like the one shown in FIG. 16 is presented on the screen of the user interface 15.

At step S71, a user moves the cursor 31 appearing in the display shown in FIG. 16 to a black circle existent at an intersection between a line drawn relative to the video camera 1-2 and a line drawn relative to the monitor 4-3. The user then clicks the black circle to instruct discontinuation of the connection (disconnection). At step S72, the user interface 15 reports information of two pieces of equipment whose disconnection has been instructed (results of selection) to the control server 13. The processing of step S73 and step S74 is fundamentally identical to that of step S28 and step S29 described in the flowchart of FIG. 9. The description of the processing will be omitted.

At step S75, the control server 13 instructs the bridge 11-2, to which the video camera 1-2 acting as a data transmitting side is connected, to realize the instructed disconnection. In response to the instruction issued from the control server 13, the bridge 11-2 sets an isochronous channel, at which data is transmitted, at step S76. A majority of equipment compatible with the AV/C protocol has the isochronous channel 63 set as a default value therein. Moreover, some video cameras do not have a means for, when a camera mode (imaging mode) is set up, disabling output of produced image data. These vide cameras are referred to as, for example, monitoring cameras that once the power supply thereof is turned on, continues outputting produced image data. A receiving side switches reception and non-reception of the image data.

At step S76, the bridge 11-2 sets an isochronous channel to be assigned to the video camera 1-2 to, for example, 63 so that image data transmitted at the channel 63 will not be transmitted to the ATM switch 5. The isochronous channel 63 must therefore be preserved in case of this kind of occasion. The isochronous channel 63 must be pre-set in the bridges 11 so that it will not be used as a channel to be set when a connection is established as mentioned above, or in short, as a channel resulting from the processing described in the flowchart of FIG. 14.

The bridge 11-2 updates a management table stored in a memory as mentioned above, and releases an isochronous channel assigned to the video camera 1-1 (updates information of the isochronous channel into information indicating that the isochronous channel is available).

The bridge 11-2 changes an isochronous channel, at which the video camera 1-2 transmits data, from one channel to another. At step S77, the bridge 11-2 requests the bridge 11-3 to discontinue a connection. In response to the request for discontinuation of a connection, the bridge 11-3 performs the same processing as that performed by the bridge 11-2 at step S76 so as to set (change) an isochronous channel at which the monitor 4-3 receives data. At step S79, the bridge 11-3 informs the bridge 11-2 of the fact that disconnection has been completed.

The bridge 11-2 and bridge 11-3 transmit disconnection information to the control server 13 at step S80 and step S81. The transmitted disconnection information includes a connection identification number, with which a connection is identified internally of the bridge 11-2 or 11-3, and an isochronous channel number used by the bridge 11-2 or 11-3.

The control server 13 updates information concerning connections contained in the database 14, that is, table 4 at step S82. When the video camera 1-2 and monitor 4-3 are disconnected from each other, the tables contained in the database 14 provide the information like the one shown in FIG. 15. The control server 13 updates the information contained in the database 14. Moreover, at step S83, the control server 13 transmits information, which indicates that disconnection has succeeded, to the user interface 15. In response to the information indicating that disconnection has succeeded, the user interface 15 presents a display informing a user of the fact at step S84.

The display presented by the user interface 15 is like the one shown in FIG. 11. Specifically, when the video camera 1-2 and monitor 4-3 are disconnected from each other, a black circle indicating establishment of a connection is changed to a white circle indicating that no connection is established. During a period of time from step S71 at which the user selects a black circle to designate desired pieces of equipment that are disconnected from each other to step S84 at which disconnection is completed and the black circle is changed to a white one, the black circle may be flickered in order to inform a user of the fact that disconnection is under way.

Referring to the flowchart of FIG. 20, a description will be made of a case where in this state, that is, when the video camera 1-1 and monitor 4-2 are disconnected from each other (the display shown in FIG. 11 is presented by the user interface 15), a user performs a predetermined manipulation to instruct disconnection of the video camera 1-1 and monitor 4-3. At step S101, the user manipulates a white circle, which indicates pieces of equipment to be newly connected to each other, appearing in the display shown in FIG. 11 and presented on the screen of the user interface 15. Herein, as shown in FIG. 21, a white circle existent at an intersection between a line drawn relative to the video camera 1-1 and a line drawn relative to the monitor 4-3 is manipulated in order to instruct connection (changed into a black one).

Figure 9:
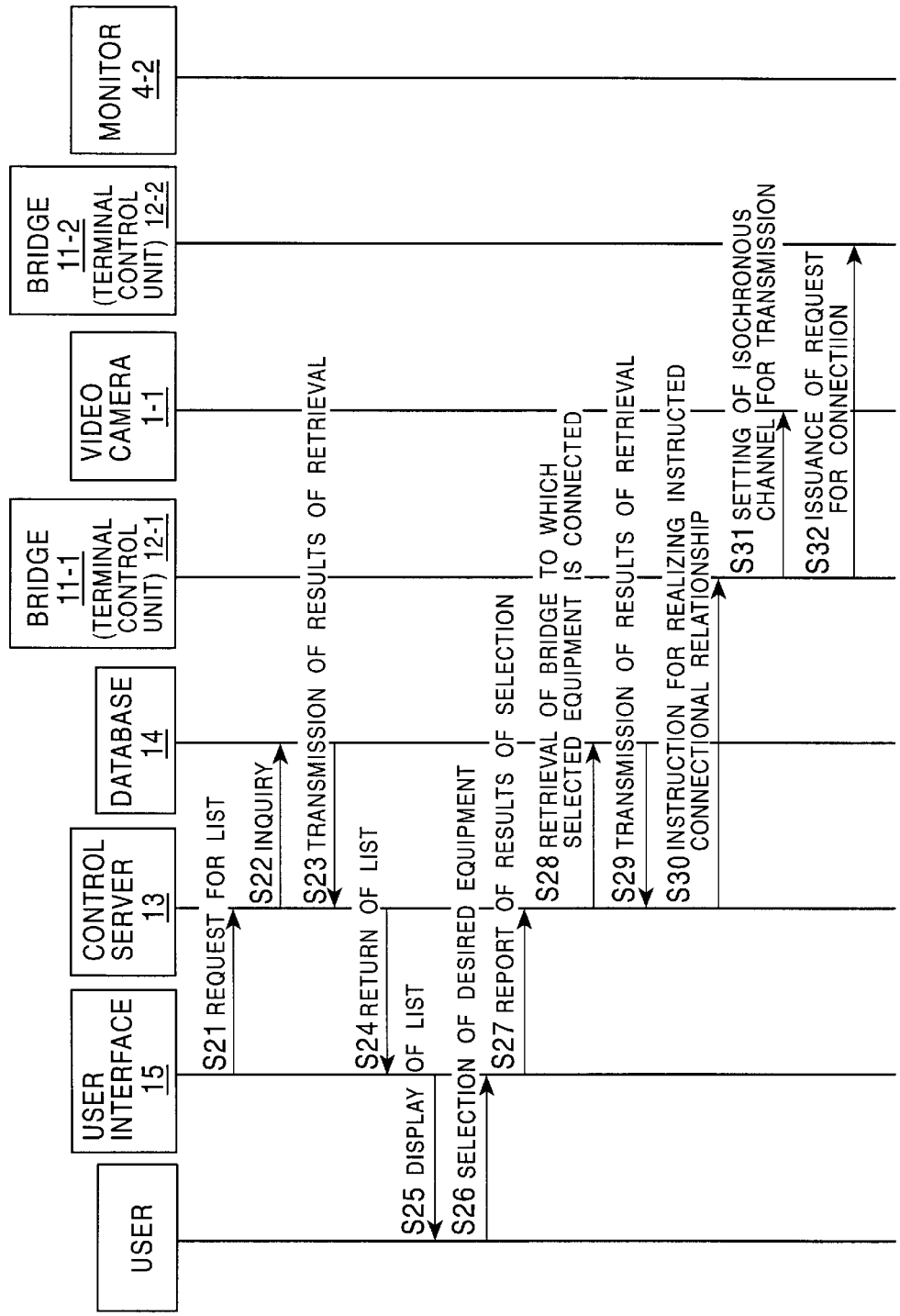
FIG. 9 is a flowchart describing actions to be performed by a system when a connection is established.

The processing from step S102 to step S104 is identical to that of step S27 to step S29 described in the flowchart of FIG. 9. The description of the processing will therefore be omitted. At step S105, the control server 13 and database 14 carry out overlay judgment overlay judgment of step S105 is carried out as described with reference to the flowchart of FIG. 17. At step S62 (FIG. 17), the bridge 11-1 to which the video camera 1-1 acting as a data transmitting side is connected is judged to have established a connection, which permits transmission of a signal sent from the video camera 1-1, to the monitor 4-2 connected to the bridge 11-2. Control is passed to step S64. The bridge 11-1 is then instructed to overlay the connection, that is, to branch the connection so as to establish new connections (processing of step S106 in FIG. 20).

Now, overlaying will be described with reference to FIG. 22. Overlaying is a kind of processing needed to realize multicasting. To be more specific, multicasting is a communication mode in which pieces of equipment belonging to a specific group connected on a network receive the same data. Overlaying is an action of branching a predetermined connection so as to realize multicasting (instructing the ATM switch 5 located on paths within the network to copy cells (data) and transmit copies to a plurality of destinations).

For multicasting, when a connection established first is regarded as a trunk, overlaying is interpreted as addition of leaves to the trunk. The leaves comparable to bridges are managed using leaf identification numbers. An inherent identification number is assigned to each connection (leaf) added due to overlaying. A leaf identification number assigned to the first connection (comparable to a trunk) is set to 0 all the time.

Figure 22A:
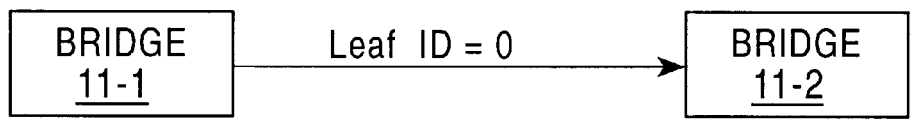
FIGS. 22A, 22B, and 22C are explanatory diagrams concerning overlaying.
Figure 22B:
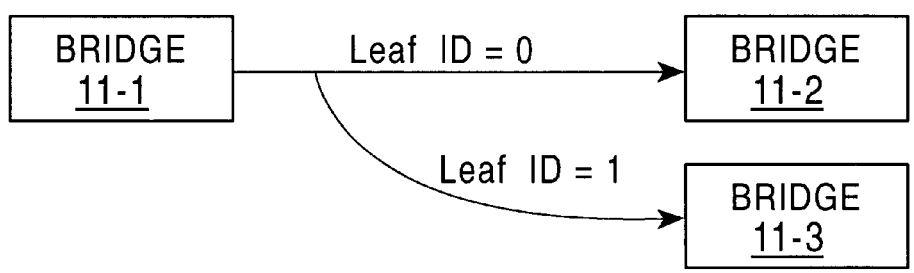

FIG. 22A shows a state in which a connection comparable to a trunk is established between the bridge 11-1 and bridge 11-2. The leaf identification number of the connection is 0 because the connection is comparable to a trunk. FIG. 22B shows a state in which a connection is established between the bridge 11-1 and bridge 11-3. Since the connection whose lead identification number is 0 has already been established relative to the bridge 11-1, a connection branching out of the connection is established between the bridge 11-1 and bridge 11-3 through overlaying. The leaf identification number of the connection established between the bridge 11-1 and bridge 11-3 is set to 1.

Figure 22C:
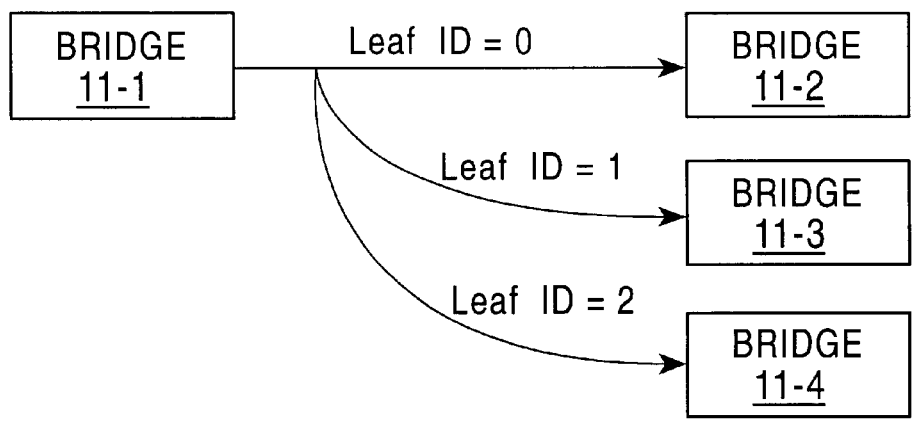

As shown in FIG. 22C, when a connection is established between the bridge 11-1 and bridge 11-4, the leaf identification number of the connection is set to 2.

Figure 20:
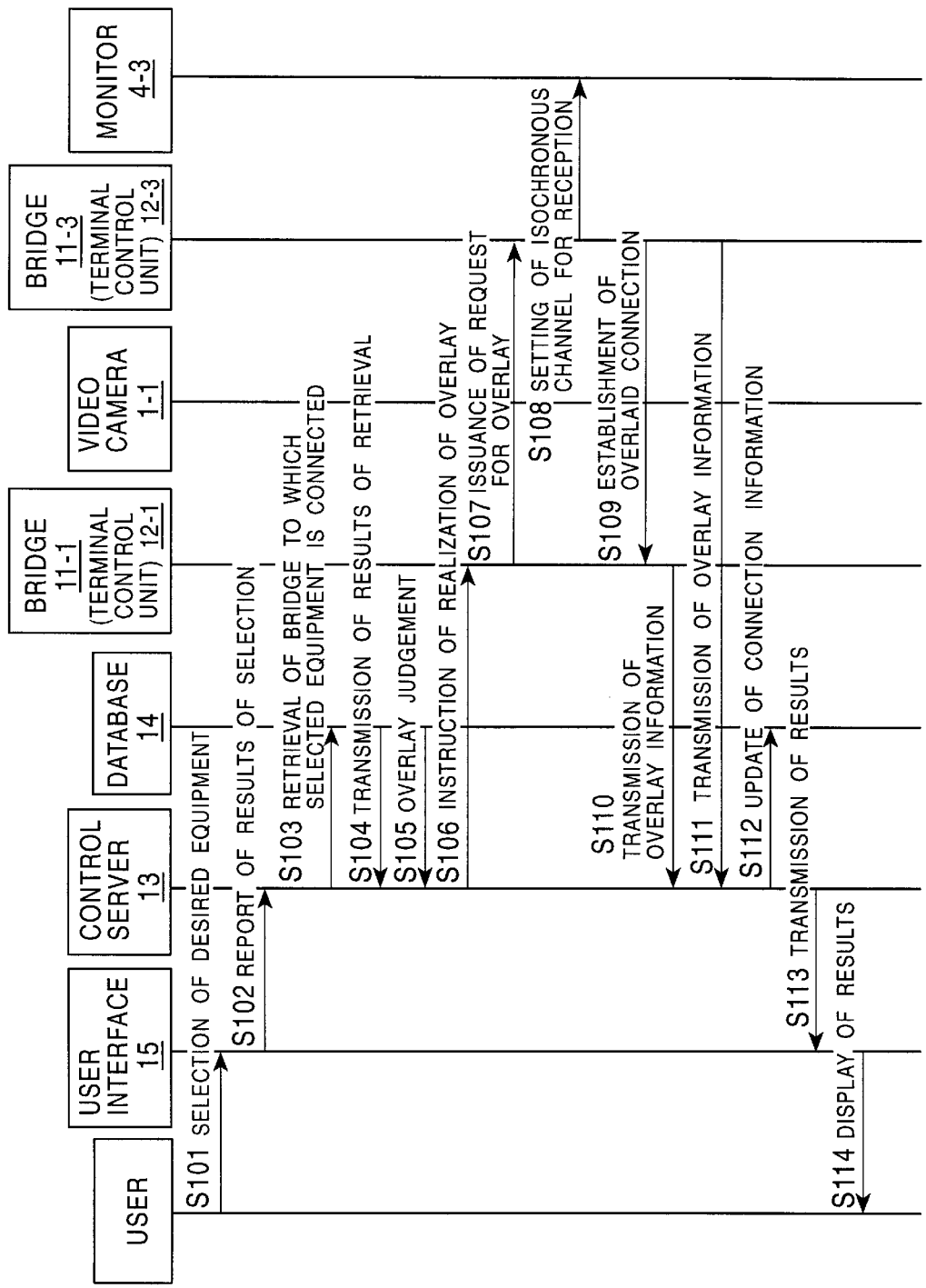
FIG. 20 is a flowchart describing processing to be performed when connections are established through overlaying.
Figure 21:
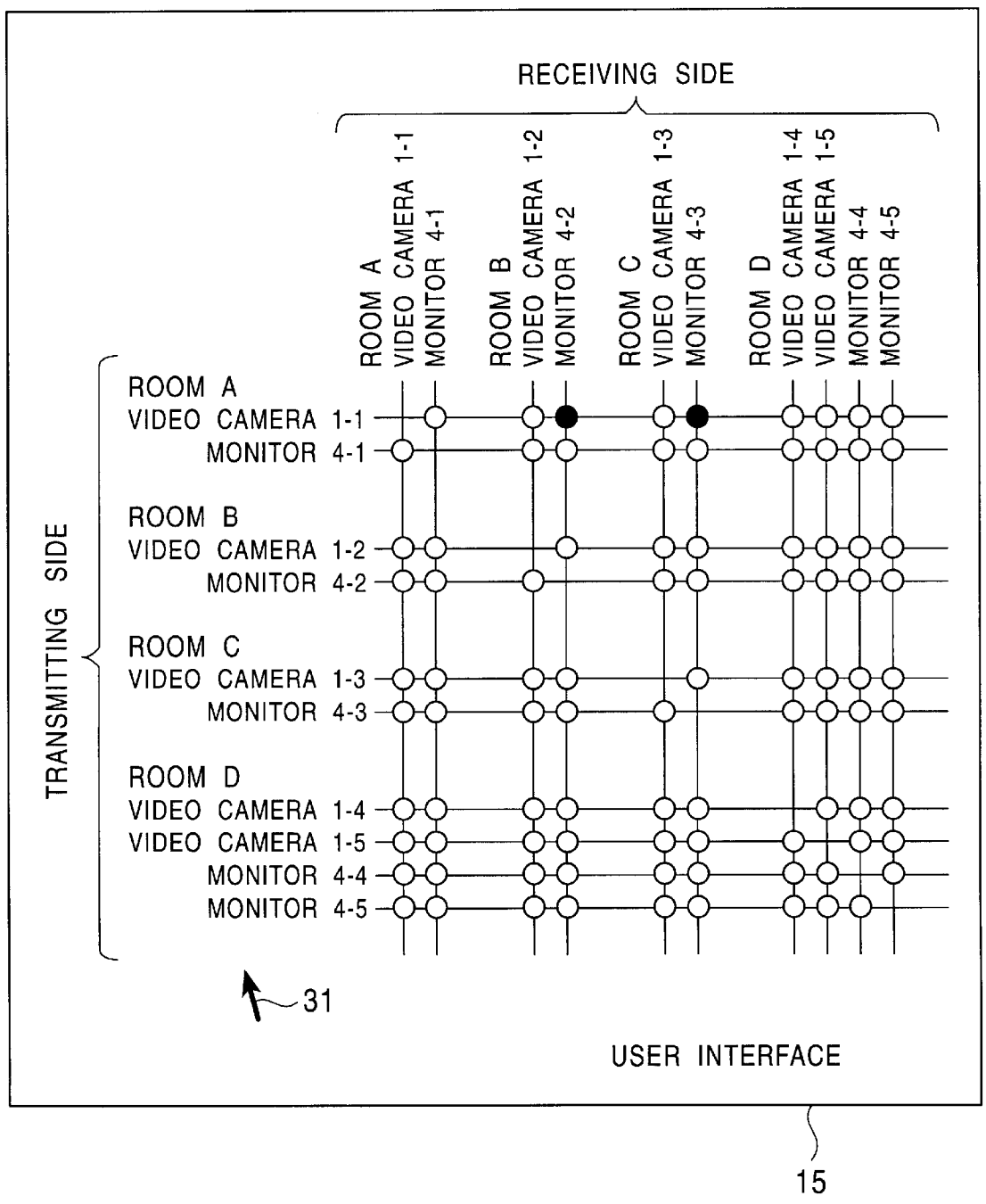
FIG. 21 shows an example of a display presented by the user interface 15.

Referring back to the flowchart of FIG. 20, at step S106, the control server 13 instructs the bridge 11-1 to realize an overlay. The instruction means that a connection already established between the bridge 11-1 and bridge 11-3 should be branched through overlaying in order to establish a new connection.

When having received the instruction of overlaying from the control server 13, the bridge 11-1 requests the bridge 11-3 to overlay a connection at step S107. In response to the request for overlaying, the bridge 11-3 sets an isochronous channel, at which data is received, at step S108. The processing of step S108 is identical to that described with reference to the flowchart of FIG. 14.

At step S109, the bridge 11-3 informs the bridge 11-1 of the fact that a connection has been established through overlaying. The bridge 11-1 and bridge 11-3 transmit information of the connection established through overlaying to the control server 13 at step S110 and step S111 respectively. Information to be transmitted includes a connection identification number, a leaf identification number, and a number of an isochronous channel used. The control server 13 having received the information updates the information contained in the database 14 at step S112.

FIG. 23 shows the information of the database 14 updated at step S112. Table 4 for managing connection information is updated. Information indicating that the video camera 1-1 and monitor 4-3 have been newly connected to each other is added to table 4. Specifically, as information of a new data outputting side (video camera 1-1), "08004601 0010001" is specified for a node identification number of equipment, and "1" is specified for a connection identification number. Moreover, "1" is specified for a leaf identification number, and "62" is specified for an isochronous channel number. The video camera 1-1 acting as a data outputting side has established a connection (trunk) to the monitor 4-2, and branches the connection to establish the new connection (leaf). The trunk connection and leaf connection share the same information, though they are mutually different in terms of the leaf identification number with which the leaf is distinguished.

As information of a new data inputting side (monitor 4-3), "08004605 0050002" is specified for a node identification number of equipment, and "2" is specified for a connection identification number. Moreover, "1" is specified for a leaf identification number, and "62" is specified for an isochronous channel number. Pieces of equipment between which a connection is established share the same leaf identification number.

The control server 13 updates the information contained in the database 14 at step S112. At step S113, the control server 13 transmits information, which indicates that a new connection has been established, to the user interface 15. At step S114, the user interface 15 informs a user of the fact that a connection has been established by presenting a display on the screen. Thus, when a connection is established, images produced by the video camera 1-1 are output to the monitor 4-2 and monitor 4-3. In short, multicasting has been achieved.

The aforesaid connections are managed according to, for example, the SVC mode. The SVC mode is characterized in that: a remote terminal is selected dynamically and data is communicated to the remote terminal; when communication is not carried out, network resources are released; and once predetermined conditions are determined, a computer in which the conditions are set establishes or discontinues a connection without bothering a user. The SVC mode is therefore suitable for the present embodiment. Needless to say, any other communication mode may be adopted in order to implement the present invention.

Recording media to be used to release a computer program, according to which the aforesaid processing is carried out, to a user include a magnetic disk, an optical disk, and a solid-state memory. In addition, communication media including a network and a satellite may be utilized. For example, a recording medium adopted for the bridge 11 shown in FIG. 6 is a solid-state memory such as the ROM 21. A communication medium used in combination with the ATM interface 23 may be adopted as a network.

In this specification, steps constituting a program to be release in the form of a medium are operations to be executed as they are described or time-sequentially. Otherwise, the steps may be operations that are not always executed time-sequentially but executed in parallel or mutually independently.

Moreover, in this specification, what is referred to as a system is the whole of a combination of a plurality of apparatuses or systems, or a software system.

In a communication control system according to the first aspect, a communication control method according to the second aspect, and a recording medium according to the third aspect, bridges to which two pieces of equipment out of a plurality of pieces of equipment having received an instruction of connection or disconnection are connected are retrieved from a database that contains predetermined information. A command enabling execution of the instruction is output to at least one of the retrieved bridges. Consequently, intra-network communication can be performed efficiently.

In a communication control system according to the fourth aspect, a communication control method according to the fifth aspect, and a recording medium according to the sixth aspect, node identification numbers of a plurality of pieces of equipment are acquired and transmitted to other system within a network. A channel is set so that data will be transmitted or received to or from equipment at the channel. Consequently, connected equipment can be utilized effectively.

In a communication control system according to the seventh aspect, a communication control method according to the eighth aspect, and a recording medium according to the ninth aspect, when a predetermined event occurs, acquisition of information concerning equipment accommodated by the network is requested. A display to be presented on an operator screen used to instruct connection or disconnection of equipment is controlled based on the acquired information. The operator screen is used to transmit information concerning equipment, of which connection or disconnection has been instructed, to other system. Consequently, intra-network communication can be performed efficiently.

In a communication system according to the tenth aspect, a communication control method according to the eleventh aspect, and a recording medium according to the twelfth aspect, a bridge acquires node identification numbers of a plurality of pieces of equipment. The bridge then transmits the node identification numbers to a communication control system, and sets a channel at which data is transmitted or received to or from equipment. A user interface controls a display to be presented on an operator screen according to information contained in a database. The operator screen is used to transmit information concerning equipment, of which connection or disconnection has been instructed, to a communication control system. Based on the transmitted information, the communication control system retrieves bridges, to which equipment is connected, from the database. The communication control system then outputs a command enabling execution of the instruction to at least one of the retrieved bridges. Based on information concerning new connection or disconnection sent from a bridge, the communication control system updates the information contained in the database. Consequently, intra-network communication can be performed efficiently.

What is claimed is:

1. A communication control system for controlling communication within a network that accommodates a plurality of bridges to which a plurality of pieces of equipment is connected, and that has said equipment, which is connected to said bridges, interconnected for transferring data via said bridges, said communication control system comprising:

a retrieving means for retrieving data identifying predetermined bridges, to which two pieces of equipment out of said plurality of pieces of equipment having received an instruction of connection or disconnection are connected, from a database containing predetermined information; and an output means for outputting a command enabling execution of the instruction to at least one of the predetermined bridges identified by said data retrieved by said retrieving means.

2. A communication control system according to claim 1, further comprising an updating means for updating the information contained in said database according to information concerning new connection or disconnection sent from a bridge.

3. A communication control system according to claim 1, wherein the information contained in said database is at least one of: identification names with which bridges are identified; node identification numbers of equipment connected to the bridges; ATM addresses of the bridges; IP addresses of the bridges; and information for managing connections established within the network.

4. A communication control system according to claim 1, further comprising a display control means for controlling a display to be presented on an operator screen, which is used to instruct connection or disconnection, according to the information contained in said database.

5. A communication control system according to claim 1, wherein the plurality of pieces of equipment and bridges transfer data according to a first communication mode, and the bridges transfer data according to a second communication mode.

6. A communication control system according to claim 5, wherein data transfer to or from said database is performed according to said second communication mode.

7. A communication control system according to claim 5, wherein said first communication mode is a mode conformable to the IEEE 1394, and said second communication mode is the asynchronous transfer mode (ATM).

8. A communication control system according to claim 7, wherein the ATM is combined with the SVC mode.

9. A computer implemented communication control method for controlling communication within a network that accommodates a plurality of bridges to which a plurality of pieces of equipment is connected, and that has said equipment, which is connected to said different bridges, interconnected for transferring data via said bridges, said communication control method comprising the computer implemented steps of:

a retrieving step of retrieving data identifying predetermined bridges, to which two pieces of equipment out of said plurality of pieces of equipment having received an instruction of connection or disconnection are connected, from a database containing predetermined information; and an output step of outputting a command, which enables execution of the instruction, to at least one of the predetermined bridges identified by said data retrieved at said retrieving step.

10. A recording medium on which a program controllable by a computer for controlling communication within a network that accommodates a plurality of bridges to which a plurality of pieces of equipment is connected, and that has said equipment, which is connected to said different bridges, interconnected for transferring data via said bridges, wherein said program comprises:

a retrieving step of retrieving data identifying predetermined bridges, to which two pieces of equipment out of said plurality of pieces of equipment having received an instruction of connection or disconnection are connected, from a database containing predetermined information; and an output step of outputting a command, which enables execution of the instruction, to at least one of the predetermined bridges identified by the data retrieved at said retrieving step.

11. A communication control system within a network that accommodates a plurality of communication control systems to which a plurality of pieces of equipment is connected, and that has said equipment, which is connected to said different communication control systems, interconnected for transferring data via said communication control systems, said communication control system comprising:

an acquiring means for acquiring node identification numbers of said plurality of pieces of equipment;

a transmitting means for transmitting the node identification numbers acquired by said acquiring means to other system accommodated by said network; and a setting means for setting a channel at which data is transmitted or received to or from said equipment.

12. A computer implemented communication control method for a communication control system within a network that accommodates a plurality of communication control systems to which a plurality of pieces of equipment is connected, and that has said equipment, which is connected to said different communication control systems, interconnected for transferring data via said communication control systems, said communication control method comprising computer implemented steps of:

an acquiring step of acquiring node identification numbers of said plurality of pieces of equipment;

a transmitting step of transmitting said node identification numbers acquired at said acquiring step to other system accommodated by said network; and a setting step of setting a channel at which data is transmitted or received to or from said equipment.

13. A recording medium on which a communication control program is stored, said program being included in a communication control system for controlling communication within a network that accommodates a plurality of communication control systems to which a plurality of pieces of equipment is connected, and that has said equipment, which is connected to said different communication control systems, interconnected for transferring data via said communication control systems, wherein said program comprises:

an acquiring step of acquiring node identification numbers of said plurality of pieces of equipment;

a transmitting step of transmitting the node identification numbers acquired at said acquiring step; and a setting step of setting a channel at which data is transmitted or received to or from said equipment.

14. A communication control system for controlling communication within a network that accommodates a plurality of bridges to which said plurality of pieces of equipment is connected, and that has said equipment, which is connected to said different bridges, interconnected for transferring data via said bridges, said communication control system comprising:

a requesting means for requesting acquisition of information concerning said equipment accommodated by said network when a predetermined event occurs;

a display control means for controlling a display to be presented on an operator screen, which is used to instruct connection or disconnection of said equipment, according to the information acquired in response to the request issued from said requesting means; and a reporting means for reporting the information concerning said equipment, of which connection or disconnection has been instructed, according to said display presented on said operator screen and controlled by said display control means.

15. A computer implemented communication control method for a communication control system, which controls communication within a network that accommodates a plurality of bridges to which a plurality of pieces of equipment is connected, and that has said equipment, which is connected to said different bridges, interconnected for transferring data via said bridges, said communication control method comprising computer implemented steps of:

a requesting step of requesting acquisition of information concerning said equipment accommodated by said network when a predetermined event occurs;

a display control step of controlling a display to be presented on an operator screen, which is used to instruct connection or disconnection of equipment, according to the information acquired as a result of said requesting step; and a reporting step of reporting the information concerning equipment, of which connection or disconnection has been instructed, according to said display presented on said operator screen and controlled at said display control step.

16. A recording medium on which a communication control program is recorded, said program being included in a communication control system for controlling communication within a network that accommodates a plurality of bridges to which a plurality of pieces of equipment is connected, and that has said equipment, which is connected to said different bridges, interconnected for transferring data via said bridges, wherein said program comprises:

a requesting step of requesting acquisition of information concerning said equipment accommodated by said network when a predetermined event occurs;

a display control step of controlling a display to be presented on an operator screen, which is used to instruct connection or disconnection of equipment, according to the information acquired as a result of said requesting step; and a reporting step of reporting the information concerning equipment, of which connection or disconnection has been instructed, according to said display presented on said operator screen and controlled at said display control step.

17. A communication system comprising communication control systems for controlling communication within a network that accommodates a plurality of bridges to which a plurality of pieces of equipment is connected, and that has said equipment, which is connected to said different bridges, interconnected for transferring data via said bridges, a database containing predetermined information, and a user interface, wherein said bridge comprises:

an acquiring means for acquiring node identification numbers of said plurality of pieces of equipment;

a first transmitting means for transmitting the node identification numbers acquired by said acquiring means to a communication control system; and a setting means for setting a channel at which data is transmitted or received to or from said equipment, wherein said user interface comprises:

a display control means for controlling a display presented on an operator screen according to the information contained in said database; and a second transmitting means for transmitting the information concerning equipment, of which connection or disconnection has been instructed, to a communication control system according to said display presented on said operator screen and controlled by said display control means, and wherein said communication control system comprises;

a retrieving means for retrieving data identifying predetermined bridges, to which equipment is connected, from said database according to the information transmitted from said second transmitting means;

an output means for outputting a command, which enables execution of the instruction, to at least one of the predetermined bridges identified by said data retrieved by said retrieving means; and an updating means for updating the information contained in said database according to information concerning new connection or disconnection sent from a bridge.

18. A communication control system according to claim 17, wherein said plurality of pieces of equipment and bridges transfer data according to a first communication mode, and said bridges transfer data according to a second communication mode.

19. A communication control system according to claim 18, wherein data transfer to or from said database is performed according to said second communication mode.

20. A communication control system according to claim 18, wherein said first communication mode is a mode conformable to the IEEE 1394, and said second communication mode is the asynchronous transfer mode (ATM).

21. A communication control system according to claim 20, wherein said ATM is combined with the SVC mode.

22. A computer implemented communication control method for a communication system comprising communication control systems which control communication within a network that accommodates a plurality of bridges to which a plurality of pieces of equipment is connected, and that has said equipment, which is connected to said different bridges, interconnected for transferring data via said bridges, a database containing predetermined information, and a user interface, said communication control method comprising computer implemented steps of:

a communication control method for a bridge that comprises:

an acquiring step of acquiring node identification numbers of said plurality of pieces of equipment;

a first transmitting step of transmitting the node identification numbers acquired at said acquiring step to a communication control system; and a setting step of setting a channel at which data is transmitted or received to or from equipment, a communication control method for a user interface that comprises:

a display control step of controlling a display presented on an operator screen according to the information contained in said database; and a second transmitting step of transmitting information concerning equipment, of which connection or disconnection has been instructed, according to the display presented on said operator screen and controlled at said display control step, and a communication control method for a communication control system that comprises:
  a retrieving step of retrieving data identifying predetermined bridges, to which equipment is connected, from said database according to the information transmitted at said second transmitting step;
  an output step of outputting a command, which enables execution of the instruction, to at least one of the predetermined bridges identified by said data retrieved at said retrieving step; and
  an updating step of updating the information contained in said database according to information concerning new connection or disconnection sent from a bridge.

23. A recording medium on which a program is recorded in a form readable by a computer, said program being employed in a communication system comprising communication control systems which control communication within a network that accommodates a plurality of bridges to which a plurality of pieces of equipment is connected and that has said equipment, which is connected to said different bridges, interconnected for transferring data via said bridges, a database containing predetermined information, and a user interface,
wherein said program comprises:
  a communication control program for a bridge comprising:
    an acquiring step of acquiring node identification numbers of said plurality of pieces of equipment;
    a first transmitting step of transmitting the node identification numbers acquired at said acquiring step to a communication control system; and
    a setting step of setting a channel at which data is transmitted or received to or from equipment,
  a communication control program for a user interface comprising:
    a display control step of controlling a display presented on an operator screen according to the information contained in said database; and
    a second transmitting step of transmitting information concerning equipment, of which connection or disconnection has been instructed, according to the display presented on said operator screen and controlled at said display control step, and
  a communication control program for a communication control system comprising:
    a retrieving step of retrieving data identifying predetermined bridges, to which equipment is connected, from said database according to the information transmitted at said second transmitting step;
    an output step of outputting a command enabling execution of the instruction to at least one of the predetermined bridges identified by the data retrieved at said retrieving step; and
    an updating step of updating the information contained in said database according to information concerning new connection or disconnection sent from a bridge.

* * * * *

UNITED STATES PATENT AND TRADEMARK OFFICE
CERTIFICATE OF CORRECTION

PATENT NO. : 6,757,743 B1
DATED : June 29, 2004
INVENTOR(S) : Tamori et al.

It is certified that error appears in the above-identified patent and that said Letters Patent is hereby corrected as shown below:

Column 2,
Lines 3, 4, 23, 26, 28, 31, 34, 38 and 41, change "OPCR" to -- oPCR --.
Lines 9 and 15, change "OMPR" to -- oMPR --.

Column 7,
Lines 63-64, change "OMPR, OPCR" to -- oMPR, oPCR --.

Column 16,
Line 1, change "connection overlaying" to -- connection. Overlaying --.

Column 18,
Line 8, change "overlay judgement overlay judgement" to -- overlay judgement. Overlay judgement --.

Signed and Sealed this

Twenty-first Day of December, 2004

JON W. DUDAS
*Director of the United States Patent and Trademark Office*